United States Patent
Na et al.

(10) Patent No.: US 12,388,992 B2
(45) Date of Patent: *Aug. 12, 2025

(54) APPARATUS AND METHOD FOR APPLYING ARTIFICIAL NEURAL NETWORK TO IMAGE ENCODING OR DECODING

(71) Applicant: SK TELECOM CO., LTD., Seoul (KR)

(72) Inventors: Tae Young Na, Seoul (KR); Sun Young Lee, Seoul (KR); Jae Seob Shin, Seoul (KR); Se Hoon Son, Seoul (KR); Hyo Song Kim, Seoul (KR); Jeong Yeon Lim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,653

(22) Filed: Jun. 10, 2024

(65) Prior Publication Data

US 2024/0333924 A1   Oct. 3, 2024

Related U.S. Application Data

(63) Continuation of application No. 17/576,000, filed on Jan. 14, 2022, now Pat. No. 12,034,921, which is a
(Continued)

(30) Foreign Application Priority Data

Feb. 23, 2018   (KR) .................. 10-2018-0021896
Feb. 23, 2018   (KR) .................. 10-2018-0022254
(Continued)

(51) Int. Cl.
*H04N 19/00*   (2014.01)
*G06N 3/04*   (2023.01)
(Continued)

(52) U.S. Cl.
CPC ............. *H04N 19/117* (2014.11); *G06N 3/04* (2013.01); *G06N 3/08* (2013.01); *G06N 5/04* (2013.01);
(Continued)

(58) Field of Classification Search
CPC .. H04N 19/117; H04N 19/124; H04N 19/176; H04N 19/82; H04N 19/86; G06N 3/04; G06N 3/08; G06N 5/04
See application file for complete search history.

(56) References Cited

U.S. PATENT DOCUMENTS 10,997,502 B1 *   5/2021   Casas ................... G06N 3/063
11,132,619 B1 *   9/2021   Casas ................... G06N 3/04
(Continued)

FOREIGN PATENT DOCUMENTS

KR   10-2013-0124517 A   11/2013
KR   10-2014-0019855 A   2/2014
(Continued)

OTHER PUBLICATIONS

International Search Report issued on Jun. 24, 2019 for corresponding international application No. PCT/KR2019/002654.
(Continued)

*Primary Examiner* — Zhihan Zhou
(74) *Attorney, Agent, or Firm* — Hauptman Ham, LLP

(57) ABSTRACT

The present disclosure relates to video encoding or decoding and, more specifically, to an apparatus and a method for applying an artificial neural network (ANN) to video encoding or decoding. The apparatus and the method of the present disclosure are characterized by applying a CNN-based filter to a first picture and at least one of a quantization parameter map and a block partition map to output a second picture.

9 Claims, 34 Drawing Sheets

Related U.S. Application Data continuation of application No. 17/064,304, filed on Oct. 6, 2020, now Pat. No. 11,265,540, which is a continuation of application No. PCT/KR2019/002654, filed on Mar. 7, 2019.

(30) Foreign Application Priority Data

| | | |
|---|---|---|
| Apr. 6, 2018 | (KR) | 10-2018-0040588 |
| Jun. 25, 2018 | (KR) | 10-2018-0072499 |
| Jun. 25, 2018 | (KR) | 10-2018-0072506 |
| Jul. 12, 2018 | (KR) | 10-2018-0081123 |
| Aug. 24, 2018 | (KR) | 10-2018-0099166 |

(51) Int. Cl.
*G06N 3/08* (2023.01)
*G06N 5/04* (2023.01)
*H04N 19/117* (2014.01)
*H04N 19/124* (2014.01)
*H04N 19/176* (2014.01)
*H04N 19/82* (2014.01)
*H04N 19/86* (2014.01)

(52) U.S. Cl.
CPC ......... *H04N 19/124* (2014.11); *H04N 19/176* (2014.11); *H04N 19/82* (2014.11); *H04N 19/86* (2014.11)

(56) References Cited

U.S. PATENT DOCUMENTS

| | | | | |
|---|---|---|---|---|
| 2012/0155532 A1* | 6/2012 | Puri | | H04N 19/51 375/E7.126 |
| 2017/0116495 A1* | 4/2017 | Nomura | | G06N 3/08 |
| 2018/0121795 A1* | 5/2018 | Kato | | G06N 3/10 |
| 2018/0249158 A1* | 8/2018 | Huang | | H04N 19/46 |
| 2019/0156201 A1* | 5/2019 | Bichler | | G06N 3/049 |
| 2019/0197656 A1* | 6/2019 | Yoda | | G06F 17/153 |
| 2019/0230354 A1* | 7/2019 | Kim | | H04N 19/82 |
| 2019/0246102 A1* | 8/2019 | Cho | | G06N 3/045 |
| 2020/0089506 A1* | 3/2020 | Power | | G06V 10/95 |
| 2020/0380665 A1* | 12/2020 | Horii | | G06T 7/0004 |

FOREIGN PATENT DOCUMENTS

| | | |
|---|---|---|
| KR | 10-2018-0001428 A | 1/2018 |
| WO | 2012/088359 A2 | 6/2012 |
| WO | 2017/036370 A1 | 3/2017 |
| WO | 2017/178827 A1 | 10/2017 |

OTHER PUBLICATIONS

Written Opinion issued for corresponding International Patent Application No. PCT/KR2019/002654 on Jun. 24, 2019.
Lulu Zhou et al., "Convolutional Neural Network Filter (CNNF) for intra frame," Joint Video Exploration Team (JVET) of ITU-T SG 16 WP 3 and ISO/IEC JTC 1/SC 29/WG 11, 9th Meeting, Jan. 20-26, 2018, Document: JVET-I0022, Gwangju, Korea.
Jonathan Pfaff et al., "Intra prediction modes based on neural networks", Joint Video Experts Team (JVET) of ITU-T SG 16 WP 3 and ISO/IEC JTC 1/SC 29/WG 11, JVET-J0037-v1, Apr. 3, 2018, 14 pages.
Korean Office Action issued on Jul. 19, 2024, in connection with the Korean Patent Application No. 10-2018-0099166, with its English translation, 12 pages.

* cited by examiner (a) (b)

(a) (b)

APPARATUS AND METHOD FOR APPLYING ARTIFICIAL NEURAL NETWORK TO IMAGE ENCODING OR DECODING

CROSS-REFERENCE TO RELATED APPLICATION

The present application is a Continuation of U.S. patent application Ser. No. 17/576,000, filed on Jan. 14, 2022, which is a Continuation of U.S. patent application Ser. No. 17/064,304, filed on Oct. 6, 2020 (U.S. Pat. No. 11,265,540 issued on Mar. 1, 2022), which is a Continuation of International Application No. PCT/KR2019/002654, filed Mar. 7, 2019, which is based upon and claims priority to (1) Patent Application No. 10-2018-0040588, filed in Korea on Apr. 6, 2018, (2) Patent Application No. 10-2018-0072499, filed in Korea on Jun. 25, 2018, (3) Patent Application No. 10-2018-0072506, filed in Korea on Jun. 25, 2018, (4) Patent Application No. 10-2018-0081123, filed in Korea on Jul. 12, 2018, (5) Patent Application No. 10-2018-0099166, filed in Korea on Aug. 24, 2018, (6) Patent Application No. 10-2018-0021896, filed in Korea on Feb. 23, 2018, and (7) Patent Application No. 10-2018-0022254, filed in Korea on Feb. 23, 2018. All of the aforementioned applications are incorporated herein by reference in their entireties.

TECHNICAL FIELD

The present disclosure relates to video encoding or decoding, and more particularly, to an apparatus and method for applying an artificial neural network (ANN) to video encoding or decoding.

BACKGROUND

The statements in this section merely provide background information related to the present disclosure and may not constitute prior art.

The data volume of video data is larger than that of audio data or still image data. Accordingly, storing or transmitting original data as it is greatly consumes hardware resources such as a memory. For this reason, it is common that video data is stored or transmitted after being compressed using an encoder, and compressed video data is played after being decompressed using a decoder.

Recently, with a rapidly increasing demand for video content such as high-capacity games and 360-degree video, the size, resolution, and frame rate of video are increasing. Accordingly, the amount of data to be compressed is also rapidly increasing, and there is an increasing need for a new high-efficiency compression technique.

It has been found from recent experimental results that replacing the in-loop filter for the existing video encoding or decoding apparatus with a filter of convolutional neural network (CNN), which is a kind of artificial neural network, can achieve a BDBR (Bjonteggrad-delta bit rate) gain of about 3.57%. Accordingly, the video encoding/decoding technique using artificial neural network technology is drawing attention as a solution to the above-described issue.

SUMMARY

In the present disclosure, various techniques for applying artificial neural network technology to a video encoding or decoding operation are proposed.

Some techniques of the present disclosure relate to mitigating quantization errors and blocking degradation using a CNN-based filter.

In accordance with one aspect of the present disclosure, provided is a video decoding method using a convolutional neural network (CNN)-based filter, the method including providing the CNN-based filter with a first reconstructed picture and at least one of a quantization parameter map and a block partition map associated with the first reconstructed picture, and obtaining a second picture as a filtered picture of the first reconstructed picture from an output of the CNN-based filter, wherein the first reconstructed picture have been reconstructed from a bitstream of a video data, and the quantization parameter map represents information about a quantization parameter for each of coding units constituting the first reconstructed picture, and the block partition map represents information about a boundary of each of the coding units constituting the first reconstructed picture.

In accordance with another aspect of the present disclosure, provided is a video decoding apparatus using a convolutional neural network (CNN)-based filter, the apparatus including an input unit configured to receive a first reconstructed picture and at least one of a quantization parameter map and a block partition map associated with the first reconstructed picture, a filter unit configured to apply the CNN-based filter to the first reconstructed picture and the at least one of the quantization parameter map and the block partition map, and an output unit configured to output a second picture obtained from an output of the CNN-based filter, wherein the first reconstructed picture have been reconstructed from a bitstream of a video data, the second picture is a filtered picture of the first reconstructed picture, and the quantization parameter map represents a quantization parameter for each of coding units constituting the first reconstructed picture, and the block partition map represents information about a boundary of each of the coding units constituting the first reconstructed picture.

According to the method and apparatus described above, the reconstructed picture may be enhanced and the issue of quantization errors and blocking artifacts may be addressed using the filter trained through supervised learning.

Some techniques of the present disclosure relate to performing CNN based intra-prediction.

In accordance with one aspect of the present disclosure, provided is a method for decoding a video using a CNN-based intra-prediction, the method including decoding, from a bitstream, transform coefficients for a current block to be decoded, determining input data containing a reference region decoded before the current block, generating predicted pixels of the current block by applying a CNN having predetermined filter coefficients to the input data, inversely transforming the transform coefficients and generating residual signals for the current block, and reconstructing the current block using the predicted pixels and the residual signals.

In accordance with another aspect of the present disclosure, provided is a video decoding apparatus using a CNN-based intra-prediction, including a decoder configured to decode, from a bitstream, transform coefficients for a current block to be decoded, a CNN setting unit configured to determine input data containing a reference region decoded before the current block, a CNN execution unit configured to generate predicted pixels of the current block by applying a CNN having predetermined filter coefficients to the input data, an inverse transformer configured to inversely transform the transform coefficients and generate residual signals for the current block, and an adder configured to reconstruct the current block using the predicted pixels and the residual signals.

According to the method and apparatus described above, as intra-prediction is performed based on the CNN, prediction accuracy may be improved with complexity of the decoding operation maintained.

Some techniques of the present disclosure relate to performing CNN-based inter-prediction.

In accordance with one aspect of the present disclosure, provided is a video decoding method including setting input data containing a search region in at least one reference picture, generating a motion vector of a current block or predicted pixels of the current block by applying a CNN having predetermined filter coefficients to the input data, inversely transforming transform coefficients extracted from a bitstream and generating residual signals for the current block, and reconstructing the current block using the residual signals, and the motion vector of the current block or predicted pixels of the current block.

In accordance with another aspect of the present disclosure, provided is a video decoding apparatus including a CNN setting unit configured to set input data containing a search region in at least one reference picture, a CNN execution unit configured to generate a motion vector of a current block or predicted pixels of the current block by applying a CNN having predetermined filter coefficients to the input data, and an inverse transformer configured to inversely transform transform coefficients extracted from the bitstream and reconstruct residual signals, wherein the current block is reconstructed using the residual signals, and the motion vector of the current block or predicted pixels of the current block.

In accordance with one aspect of the present disclosure, provided is a video decoding method including generating a motion vector of a current block or predicted pixels of the current block based on a syntax element for an inter-prediction mode extracted from a bitstream, setting input data containing a search region in at least one reference picture, and the motion vector of the current block or the predicted pixels of the current block, generating a refined motion vector of the current block or refined predicted pixels of the current block by applying a CNN having predetermined filter coefficients to the input data, generating residual signals by inversely transforming transform coefficients extracted from the bitstream, and reconstructing the current block using the residual signals, and the refined motion vector of the current block or the refined predicted pixels of the current block.

In accordance with another aspect of the present disclosure, provided is a video decoding apparatus including a CNN setting unit configured to set a motion vector of a current block or predicted pixels of the current block generated based on a syntax element for an inter-prediction mode extracted from a bitstream to input data, a CNN execution unit configured to generate a refined motion vector of the current block or refined predicted pixels of the current block by applying a CNN having predetermined filter coefficients to the input data, and an inverse transformer configured to generate residual signals by inversely transforming transform coefficients extracted from the bitstream, wherein the current block is reconstructed using the residual signals, and the refined motion vector of the current block or the refined predicted pixels of the current block.

According to the methods and apparatuses described above, as inter-prediction is performed based on the CNN, prediction accuracy may be improved with complexity of the decoding operation maintained.

Some techniques of the present disclosure relate to filtering a reference region used for intra-prediction using a CNN-based filter.

In accordance with one aspect of the present disclosure, provided is a video decoding method including decoding, from a bitstream, transform coefficients for a current block to be decoded, setting input data of a CNN using a first reference region decoded before the current block, generating a second reference region by filtering the first reference region by applying the CNN having predetermined filter coefficients to the input data, generating a prediction block of the current block by performing intra-prediction using the second reference region, generating residual signals for the current block by inversely transforming the transform coefficients, and reconstructing the current block using the prediction block and the residual signals.

In accordance with another aspect of the present disclosure, provided is a video decoding apparatus including a decoder configured to decode, from a bitstream, transform coefficients for a current block to be decoded, an intra-predictor configured to generate a prediction block of the current block by performing intra-prediction using a second reference region generated by filtering a first reference region selected from among regions decoded before the current block, an inverse transformer configured to generate residual signals for the current block by inversely transforming the transform coefficients, and an adder configured to reconstruct the current block using the prediction block and the residual signals, wherein the second reference region is generated by filtering the first reference region by applying the CNN having predetermined filter coefficients to input data set using the first reference region.

According to the method and apparatus described above, as a neighboring region used for intra-prediction of a current block is filtered using a CNN-based filter, prediction accuracy may be greatly improved without significantly changing the existing intra-prediction structure.

DETAILED DESCRIPTION

Figure 1:
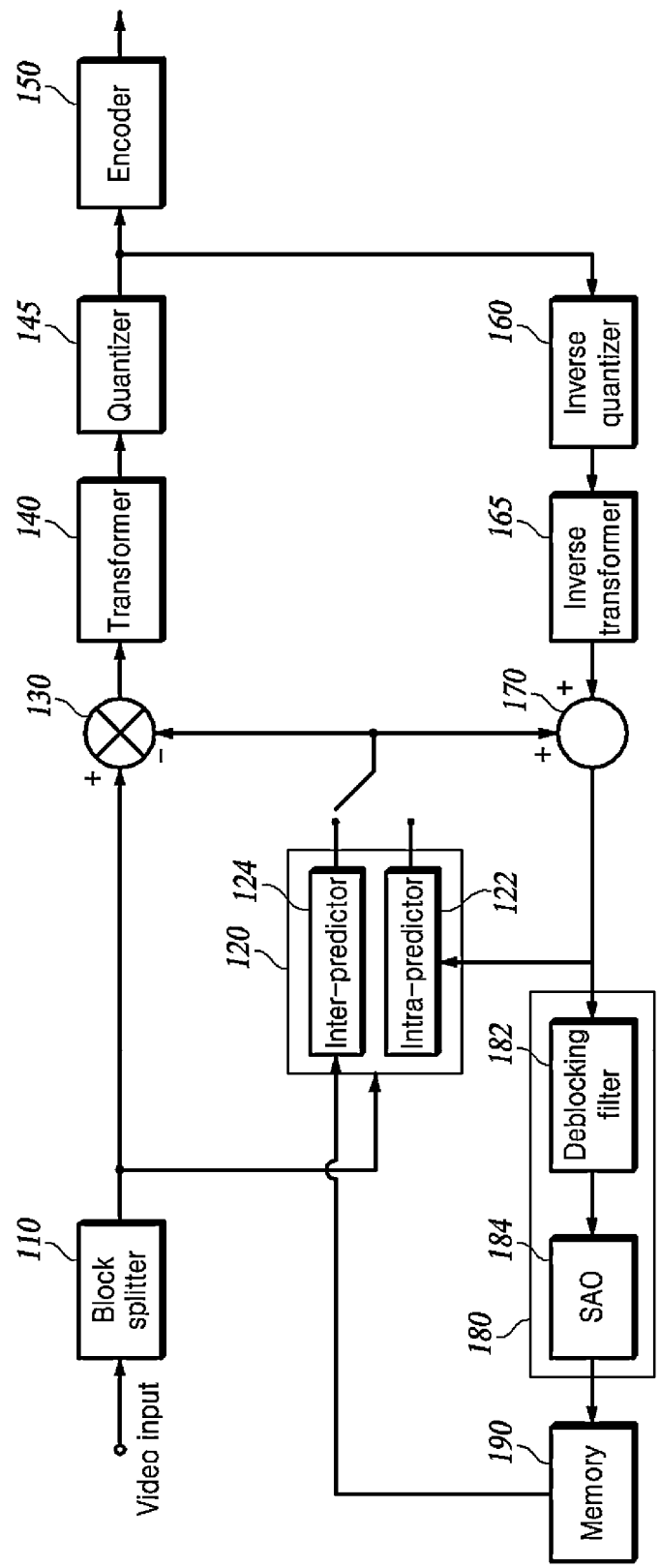
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

Various terms such as first, second, A, B, (a), (b), etc., are used solely for the purpose of differentiating one component from the other but neither imply nor suggest the substances, order or sequence of the components. Throughout this specification, when a part "includes" or "comprises" a component, the part may further include other components, and such other components are not excluded unless there is a particular description contrary thereto. Terms such as "unit," "module," and the like refer to units for processing at least one function or operation, which may be implemented by hardware, software, or a combination thereof.

FIG. 1 is an exemplary block diagram of a video coding apparatus capable of implementing techniques of the present disclosure. Hereinafter, a video encoding apparatus and elements of the apparatus will be described with reference to FIG. 1.

The video coding apparatus may include a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the respective functions of the software (elements).

One video (video) is composed of a plurality of pictures. Each picture is split into a plurality of regions, and encoding is performed on each region. For example, one picture is split into one or more tiles. Here, the one or more tiles may be defined as a tile group. Each tile is split into one or more coding tree units (CTUs). In addition, each CTU is split into one or more coding units (CUs) by a tree structure.

Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group to which the tile belongs, and information applied to all blocks constituting one picture are encoded in a picture parameter set (PPS) or a picture header.

Further, information referred to by a plurality of pictures in common is encoded in a sequence parameter set (SPS). In addition, information referred to by one or more SPSs in common is coded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the split CTUs using a tree structure. A leaf node in the tree structure serves as a coding unit (CU), which is a basic unit of coding.

The tree structure may include a Quad Tree (QT), in which a node (or parent node) is split into four sub-nodes (or child nodes) of the same size, a Binary Tree (BT), in which a node is split into two sub-nodes, and a Ternary Tree (TT), in which a node is split into three sub-nodes at a ratio of 1:2:1.

The tree structure may also include a structure formed by a combination of two or more of the QT structure, the BT structure, and the TT structure. For example, a Quad Tree plus Binary Tree (QTBT) structure may be used, or a Quad Tree plus Binary Tree Ternary Tree (QTBTTT) structure may be used.

Figure 2:
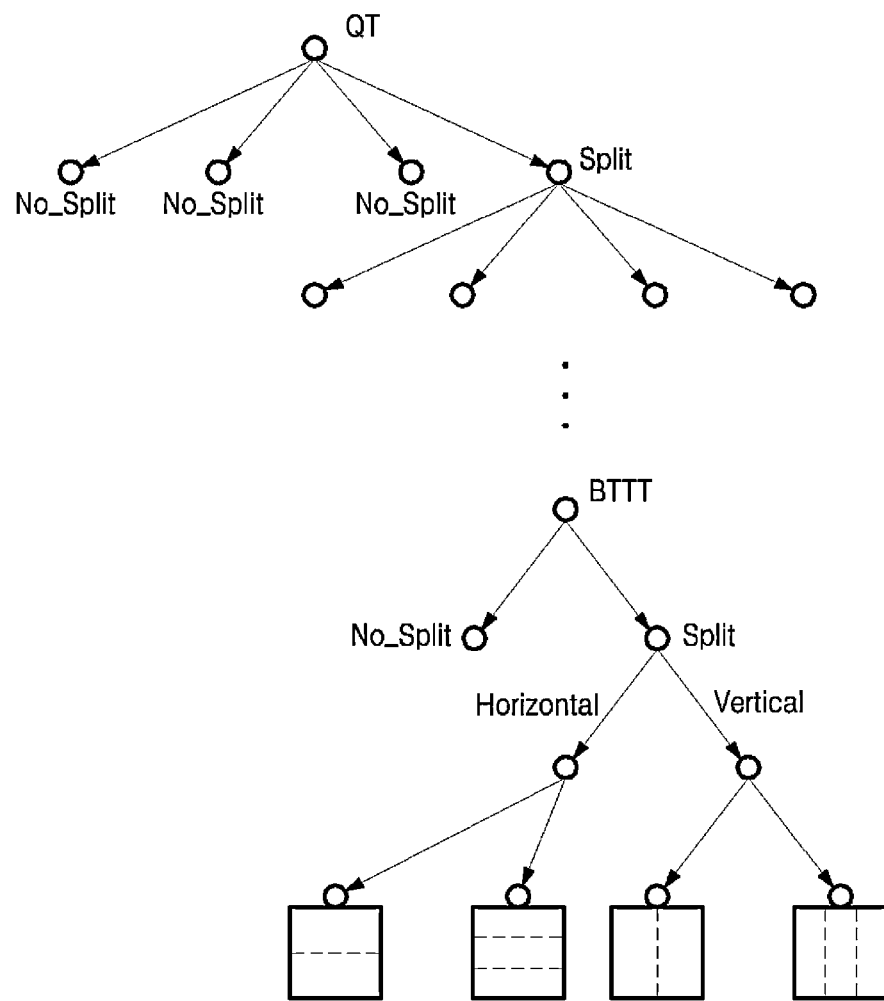
FIG. 2 is a diagram illustrating block splitting using a QTBTTT structure.

FIG. 2 is a diagram illustrating block splitting using a QTBTTT structure. As shown in FIG. 2, a CTU may be initially split according to the QT structure. The QT splitting may be repeated until the size of the splitting block reaches the minimum block size MinQTSize of a leaf node allowed in the QT.

When the leaf node of the QT is not larger than the maximum block size (MaxBTSize) of the root node allowed in the BT, it may be further split into one or more of the BT structure or the TT structure. In the BT structure and/or the TT structure may have a plurality of splitting directions.

For example, in some examples, there may be two splitting types, which are a type of horizontally splitting a block of a node (i.e., horizontal splitting) and a type of vertically splitting the block (i.e., vertical splitting).

As illustrated in FIG. 2, when BTTT splitting is performed, a flag indicating whether nodes are split, a flag indicating a splitting direction (vertical or horizontal), and/or a flag indicating a splitting type (Binary or Ternary) may be signaled to the video decoding apparatus.

There may be an additional type of splitting a block of a node into two asymmetric blocks. The asymmetric splitting type may include a type of splitting a block into two rectangular blocks at a size ratio of 1:3, and a type of splitting a block of a node in a diagonal direction.

When QTBT is used as another example of the tree structure, a CTU may be initially split in a QT structure, and then leaf nodes of the QT may be further split in a BT structure.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a prediction block. The predictor 120 may include an intra-predictor 122 and an inter-predictor 124. In general, current blocks within a picture may each be predictively coded. Prediction of the current blocks may be accomplished using an intra-prediction technique, which uses data of a picture containing the current blocks, or an inter-prediction technique, which uses data of a picture coded before the picture containing the current blocks.

Figure 3:
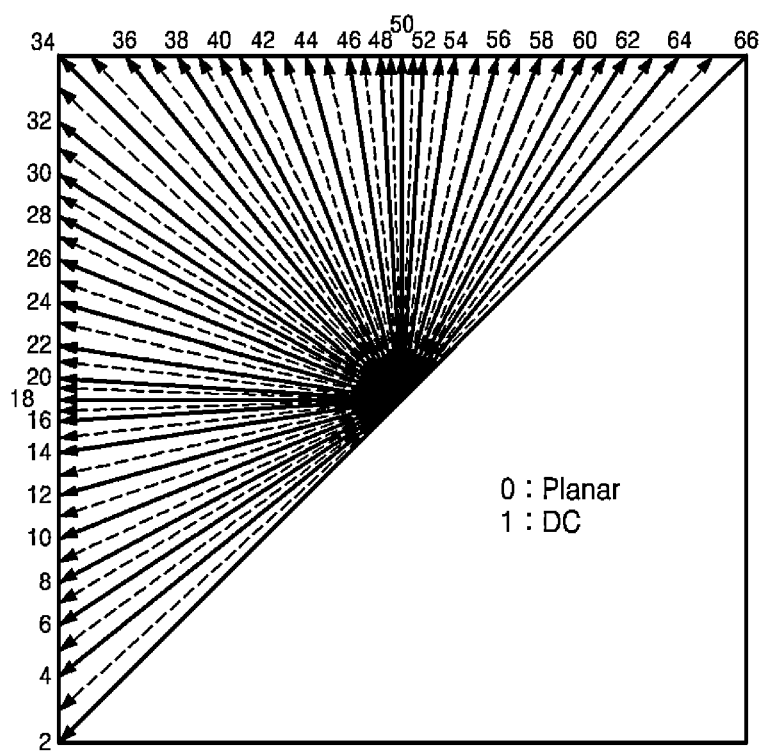
FIG. 3 is an exemplary diagram for a plurality of intra-prediction modes.

The intra-predictor 122 predicts pixels in the current block using pixels (reference pixels) located around the current block in the current picture in which the current block is included. There is a plurality of intra-prediction modes according to the prediction directions. For example, as shown in FIG. 3, the plurality of intra-prediction modes may include non-directional modes, which may include a planar mode and a DC mode, and 65 directional modes. Peripheral pixels and an equation to be used are defined differently for each prediction mode.

As will be described later, the intra-predictor 122 may predict pixels in a current block based on the reference pixels through a CNN-based learning and inference process. In this case, the intra-predictor 122 may operate a CNN-based intra-prediction mode (hereinafter referred to as "CNN mode") in parallel with the plurality of intra-prediction modes illustrated in FIG. 3. Alternatively, the intra-predictor 122 may independently operate only the CNN mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. As described later, in the CNN mode, the intra-predictor 122 predicts the current block based on input data and coefficient values of the convolution kernel.

Information about the selected intra-prediction mode is encoded by the encoder 150 and transmitted to the video decoding apparatus. To efficiently encode intra-prediction mode information indicating which of the plurality of intra-prediction modes is used as the intra-prediction mode of the current block, the intra-predictor 122 may determine some modes which are very likely to be the intra-prediction mode of the current block among the intra-prediction modes as the most probable modes (MPMs).

The MPM list may include the intra-prediction modes, planar mode, and DC mode of neighboring blocks of the current block. The MPM list may further include the CNN mode.

When the intra-prediction mode of the current block is selected from among the MPMs, first intra-identification information indicating which of the MPMs is selected as the intra-prediction mode of the current block is encoded by the encoder 150 and signaled to the video decoding apparatus.

On the other hand, when the intra-prediction mode of the current block is not selected from among the MPMs, second intra-identification information indicating which of the remaining modes other than the MPMs is selected as the intra-prediction mode of the current block is encoded by the encoder 150 and signaled to the video decoding apparatus.

The inter predictor 124 searches for a block most similar to the current block in the reference picture encoded and decoded before the current picture through a motion estimation process, and generates a prediction block for the current block based on the searched block through a motion compensation process. Inter-prediction may be generally classified into unidirectional prediction and bidirectional prediction according to the prediction direction. Unidirectional prediction refers to predicting a current block using only a picture displayed before or after a current picture in the time domain. Bidirectional prediction refers to predicting a current block with reference to both a picture displayed before the current picture and a picture displayed after the current picture in the time domain.

The inter-predictor 124 generates a motion vector corresponding to a displacement between the current block in the current picture and the prediction block in the reference picture. In general, motion estimation is performed in terms of the luma component, and a motion vector calculated based on the luma component is used for both the luma component and the chroma component.

The motion information including information about the reference picture and information about a motion vector used to predict the current block is encoded by the encoder 150 and transmitted to the video decoding apparatus.

Various methods may be used to reduce or minimize the amount of bits required to encode the motion information. Typical examples of the various methods include a Skip mode, a Merge mode, and an Adaptive (Advanced) motion vector predictor (AMVP) mode.

In the Skip mode and the Merge mode, a preset number of candidate blocks are selected from among neighboring blocks. When candidate blocks are selected, the inter-predictor 124 configures a merge list including the candidate blocks, selects motion information to be used as motion information about the current block from the motion information about the candidate blocks included in the list, and generates a merge index value for identifying the selected motion information (about a selected candidate block).

The index value of the selected motion information, that is, the merge index value, is encoded and signaled to the video decoding apparatus. In the HEVC standard, the index value for the Skip/Merge mode is represented through the merge_idx syntax.

In the AMVP mode, motion vector predictor (MVP) candidates for the motion vector of the current block are initially derived using neighboring blocks of the current block. When the MVP candidates are derived, the inter-predictor 124 determines an MVP for the motion vector of the current block, and calculates a motion vector difference (MVD) by subtracting the determined MVP from the motion vector of the current block. The calculated MVD is encoded and signaled to the video decoding apparatus.

The process of determining the MVP from the MVP candidates may be implemented through a predefined function (e.g., calculation of a median value, calculation of an average value, etc.). In this case, the video decoding apparatus is set to apply the predefined function.

Since the neighboring blocks used to derive the MVP candidates correspond to blocks that have already been encoded and decoded, the video decoding apparatus already recognizes the motion vectors for the neighboring blocks. Since information for identifying the MVP candidates does not need to be encoded, the video encoding apparatus encodes only information about the MVD and information about the reference picture used to predict the current block.

The process of determining the MVP from the MVP candidates may be implemented by selecting any one of the MVP candidates. In this case, the information for identifying the determined MVP is additionally encoded together with the information about the MVD and the information about the reference picture used to predict the current block.

In addition, as will be described later, the inter-predictor 124 may predict the current block through a CNN-based inference process. To this end, filter coefficients of the CNN, that is, coefficients of the convolution kernel may be set through a supervised training process of the CNN.

In addition, the inter-predictor 124 may primarily generate motion information about the current block or predicted pixels according to an existing inter-prediction scheme (i.e., motion estimation (ME) and motion compensation (MC)), and then secondarily refine the generated motion information or predicted pixels through a CNN-based learning and inference process to predict the current block.

Further, the inter-predictor 124 may operate the existing inter-prediction scheme in parallel with the CNN-based inter-prediction scheme (hereinafter referred to as a "CNN prediction mode"). Alternatively, the inter-predictor 124 may independently operate only the CNN prediction mode in place of the existing inter-prediction scheme.

The subtractor 130 generates a residual block by performing subtraction operation on the current block and the prediction block generated by the intra-predictor 122 or the inter-predictor 124, and the transformer 140 transforms residual signals of the residual block having pixel values of the spatial domain into transform coefficients in the frequency domain.

The transformer 140 may transform residual signals in the residual block using the size of the current block as a transformation unit, and may split the residual block into a plurality of smaller sub-blocks, and transform the residual signals on a sub-block-size transformation basis.

There may be various methods to split the residual block into smaller sub-blocks. For example, the residual block may be split into sub-blocks having the same predefined size, and Quad Tree (QT) splitting using the residual block as a root node may be used.

The quantizer 145 quantizes the transform coefficients output from the transformer 140 and outputs the quantized transform coefficients to the encoder 150.

The encoder 150 generates a bitstream by encoding the quantized transform coefficients using an encoding scheme such as CABAC. In addition, the encoder 150 encodes and signals information such as a CTU size, a QT split flag, a BTTT split flag, a split direction, and a split type related to block splitting, such that the video decoding apparatus may split the block in the same manner as the video encoding apparatus.

Also, the encoder 150 encodes prediction type information indicating whether the current block is encoded by intra-prediction or inter-prediction, and encodes intra-prediction information (i.e., information about the intra-prediction mode) or inter-prediction information (information about the reference picture and the motion vector) according to the prediction type.

Furthermore, when both the existing inter-prediction scheme and the CNN-based inter-prediction method are used, the encoder 150 encodes the information (flag) indicating whether to use the CNN-based inter-prediction scheme. When the CNN-based inter-prediction CNN based is not used, the typical inter-prediction scheme is used, and accordingly the encoder 150 encodes the information about the reference picture and the motion vector as inter-prediction information. On the other hand, when the CNN-based inter-prediction scheme is used, the encoder 150 encodes information necessary for CNN-based inter-prediction as inter-prediction information. As another example, when only the CNN-based inter-prediction scheme is used in place of the existing inter-prediction scheme, the encoder 150 encodes the information necessary for CNN-based inter-prediction. The information necessary for CNN-based inter-prediction may include selection information about CNN input data or filter coefficients, which will be described later in detail with reference to FIG. 22 and the like.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain to reconstruct the residual block.

The adder 170 adds the reconstructed residual block to the prediction block generated by the predictor 120 to reconstruct the current block. The pixels in the reconstructed current block are used as reference samples for intra-prediction of the next block in order.

The filter unit 180 filters the reconstructed pixels to reduce blocking artifacts, ringing artifacts, and blurring artifacts generated due to block-based prediction and transformation/quantization. For filtering. The filter unit 180 may include a deblocking filter 182 and an SAO filter 184.

The deblocking filter 180 filters the boundary between the reconstructed blocks to remove blocking artifacts generated due to block-by-block coding/decoding, and the SAO filter 184 performs additional filtering on the deblocking-filtered video. The SAO filter 184 corresponds to a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of a block in a picture to be encoded.

Figure 4:
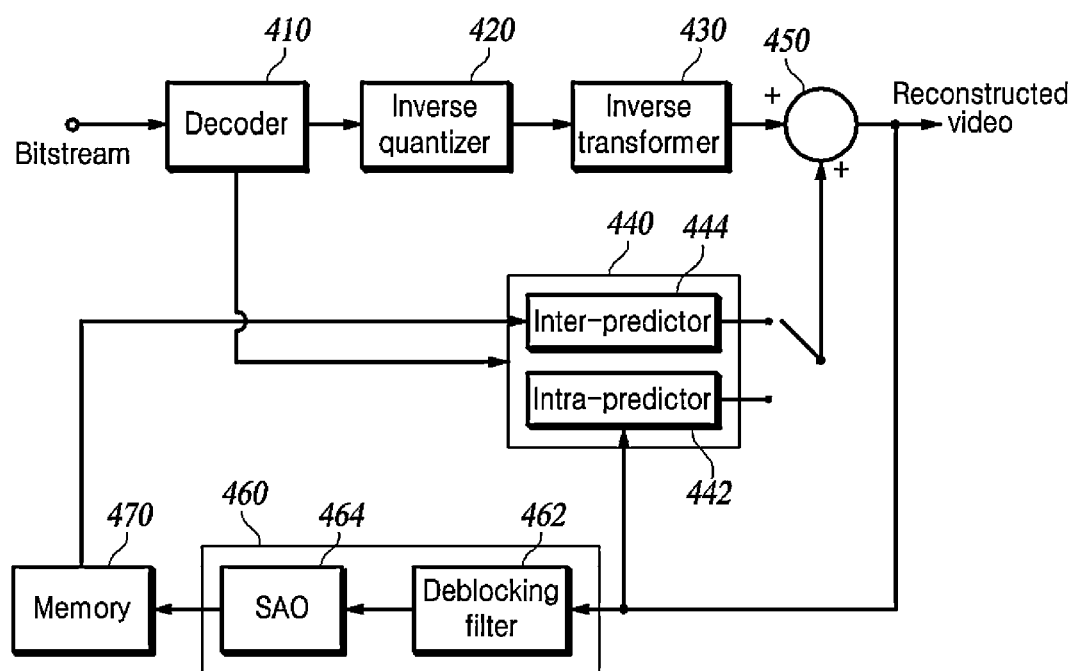
FIG. 4 is an exemplary block diagram of a video decoding apparatus capable of implementing the techniques of the present disclosure.

FIG. 4 is an exemplary block diagram of a video decoding apparatus capable of implementing the techniques of the present disclosure. Hereinafter, a video decoding apparatus and elements of the apparatus will be described with reference to FIG. 4.

As shown in FIG. 4, the video decoding apparatus may include a decoder 410, an inverse quantizer 420, an inverse transformer 430, a predictor 440, and an adder 450, a filter unit 460, and a memory 470

In the video decoding apparatus, as in the video encoding apparatus illustrated in FIG. 1, each element may be implemented as a hardware chip. The functions of the respective elements may be implemented in software and a microprocessor may be configured to execute the respective functions of the software.

The decoder 410 decodes the bitstream received from the video encoding apparatus, extracts information related to block splitting (splitting information about a luma block and/or splitting information about a chroma block), and determines a current block to be decoded based on the extracted information, and extracts prediction information necessary to reconstruct the current block and information about residual signals.

The decoder 410 extracts information about the CTU size from the sequence parameter set (SPS) or the picture parameter set (PPS), determines the size of the CTU, and splits a picture into CTUs of the determined size. In addition, the decoder 410 determines the CTU as the top layer, that is, the root node, of the tree structure, extracts the splitting information from the bitstream, and then splits or reconstructs the block based on the extracted information.

In addition, the decoder 410 extracts information about whether a block is BT-split and a splitting type (splitting direction) for a node corresponding to a leaf node of QT splitting, and splits the leaf node in a BT structure.

As another example, when a block is split or reconstructed using a QTBTTT structure, the decoder 410 extracts information (flag) indicating whether QT splitting is performed, and splits each node into four nodes of a lower layer. For a node corresponding to a leaf node of QT splitting (a node at which QT splitting does not occur anymore), the decoder extracts information about whether the node is further split in a BT or TT structure, information about the splitting direction, and splitting type information for identifying whether the splitting is performed in the BT structure or the TT structure, and recursively splits the node in the BT or TT structure.

As another example, when a block is split or reconstructed using the QTBTTT structure, the decoder 410 extracts information (e.g., a flag) indicating whether splitting is performed, and extract, when the block is split, splitting type information. When the splitting type is QT, the decoder 410 splits each node into four nodes corresponding to a lower layer. When the splitting type indicates the leaf node of the QT splitting (the node at which the QT splitting does not occur anymore) type, that is, splitting into BT or TT, the decoder 410 additionally provides information about the splitting direction and splitting type information for distinguishing whether the splitting structure is a BT structure or a TT structure, and splits the node in the BT or TT structure.

As described above, once a current block to be decoded is determined based on the splitting information, the decoder 410 extracts information about a prediction type indicating whether the current block is intra-predicted or inter-predicted.

When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector (motion information about the current block).

The decoder 410 extracts information about quantized transform coefficients of the current block as information about the residual signals.

The inverse quantizer 420 inversely quantizes the quantized transform coefficients, and the inverse transformer 430 inversely transforms the inversely quantized transform coefficients from the frequency domain to the spatial domain to reconstruct the residual signals to generate a residual block for the current block.

The predictor 440 may include an intra-predictor 442 and an inter-predictor 444. The intra-predictor 342 is activated when the prediction type of the current block is intra-prediction, and the inter-predictor 344 is activated when the prediction type of the current block is intra-prediction.

The intra-predictor 442 determines an intra-prediction mode of the current block among a plurality of intra-prediction modes based on a syntax element for the intra-prediction mode extracted from the decoder 410, and predicts the current block using the reference pixels around the current block according to the determined intra-prediction mode.

As will be described later, when the intra-prediction mode for the current block is determined as the CNN mode, the intra-predictor 442 may perform the inference process of the CNN using the coefficients (i.e., filter coefficients) of the convolution kernel determined by the video encoding apparatus, thereby predicting the current block.

The inter-predictor 444 determines a motion vector of the current block and a reference picture referred to by the motion vector using the syntax element for the inter-prediction mode extracted from the decoder 410, and predicts the current block through the motion vector and the reference picture.

As will be described later, the inter-predictor 444 may generate a motion vector of the current block or directly generate predicted pixels of the current block, through a CNN-based inference process.

In addition, the inter-predictor 444 may primarily generate a motion vector or predicted pixels of the current block according to an existing inter-prediction mode (i.e., motion compensation (MC)), and then secondarily refine the motion vector or the predicted pixels through a CNN-based inference process, thereby finally generating the motion vector or predicted pixels of the current block.

The inter-predictor 444 may operate the CNN-based inter-prediction mode in parallel with the existing inter-prediction mode. In this case, the decoder 410 additionally decodes information (e.g., a flag) indicating whether the prediction type information is CNN-based inter-prediction when the prediction type information indicates inter-prediction. The inter-predictor 444 selectively performs the existing inter-prediction or the CNN-based inter-prediction according to the information indicating whether the prediction is CNN-based inter-prediction decoded by the decoder 410. Alternatively, the inter-predictor 444 may independently operate only the CNN-based inter-prediction mode. In this case, the inter-predictor 444 performs CNN-based inter-prediction when the prediction type information (the information indicating intra-prediction or inter-prediction) decoded by the decoder 410 indicates inter-prediction.

The adder 450 reconstructs the current block by adding the residual block output from the inverse transformer 430 and the prediction block output from the inter-predictor 444 or the intra-predictor 442. The pixels in the reconstructed current block are used as reference pixels for intra-prediction of a block to be decoded next.

The filter unit 460 includes a deblocking filter 462 and an SAO filter 464. The deblocking filter 462 deblocks the boundary between the reconstructed blocks to remove blocking artifacts produced due to block-by-block decoding. The SAO filter 464 performs additional filtering on the reconstructed block after deblocking filtering to compensate for the difference between the reconstructed pixels and the original pixels caused by lossy coding.

The reconstructed blocks filtered through the deblocking filter 462 and the SAO filter 464 are stored in the memory 470. When all blocks in one picture are reconstructed, the reconstructed picture is used as a reference picture for inter-prediction of blocks in a picture to be encoded next.

The techniques of the present disclosure generally relate to applying artificial neural network technology to video encoding or decoding.

Some techniques of the present disclosure relate to a CNN-based filter capable of performing the functions of the deblocking filter and the SAO filter in the video encoding apparatus and decoding apparatus. Some other techniques of the present disclosure relate to performing CNN-based intra-prediction. Some other techniques of the present disclosure relate to performing CNN-based inter-prediction. Some other techniques of the present disclosure relate to performing CNN-based filtering on a reference region used for intra-prediction of a current block.

Figure 5:
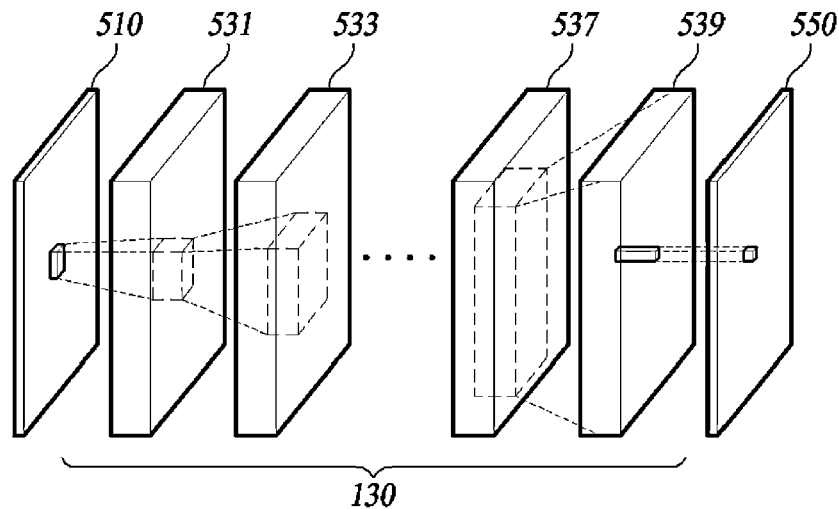
FIG. 5 is a diagram illustrating an exemplary structure of a CNN usable for the techniques of the present disclosure.

FIG. 5 is a diagram illustrating an exemplary structure of a CNN that may be used in the techniques of the present disclosure.

Referring to FIG. 5, a convolutional neural network (CNN) is a multi-layer neural network having a special connection structure designed for image processing, and may include an input layer 510, a hidden layer 530, and an output layer 550. The hidden layer 530 is positioned between the input layer 510 and the output layer 550, and may include a plurality of convolutional layers 531 to 439. The hidden layer 530 may further include an upsampling layer or a pooling layer to adjust the resolution of a feature map, which is a result of the convolution operation. In addition, the CNN may have Very Deep Super Resolution (VDSR) or a structure (not shown) that combines ResNet with VDSR.

All layers constituting the CNN may each include a plurality of nodes. Each node of a layer may be interconnected with nodes of other layers adjacent thereto to transmit an output value obtained by applying a predetermined connection weight as an input to other nodes.

The convolutional layers 531 to 539 each may generate a feature map by performing the convolution operation on video data input to each layer using a convolution kernel (i.e., filter) which is in the form of a 2D matrix or a 3D matrix. Here, the feature map represents video data in which various features of video data input to each layer are expressed. The number of convolutional layers 531 to 539, the size of the convolution kernel, and the like may be preset before the training process.

The output layer 550 may be configured as a fully connected layer. The nodes of the output layer 550 may output video data by combining various features expressed in the feature map.

The CNN algorithm may be divided into a training process and an inference process. The training process may be classified into supervised learning, unsupervised learning, and reinforcement learning according to training techniques. The supervised learning represents an operation of calculating coefficient values of the convolution kernel (i.e., filter coefficients) using an output label, which is an explicit answer (i.e., ground-truth) to data input to the input layer 510 (hereinafter referred to as "input data").

The filter coefficients of the CNN may be calculated through repeated supervised learning using an error backpropagation algorithm for predetermined input data. Specifically, according to the error backpropagation algorithm, an error between the output data of the CNN and the output label is propagated in the reverse direction from the output layer 550 to the input layer 510 via the hidden layer 530. In the propagation process of the error, connection weights between nodes are updated so as to reduce the error. Then, the supervised learning process of the CNN may be repeated until the error is less than a preset threshold. Thereby, optimal filter coefficients to be used in the inference process of the CNN may be calculated.

Hereinafter, the techniques of the present disclosure using the CNN in part of the video encoding or decoding operation are described in detail.

1. Improving Image Quality Using a CNN-Based Filter

Hereinafter, a technique whose image quality is to be improved using a CNN-based filter will be described with reference to FIGS. 6 to 13. The CNN-based filter described below may be used in both a video encoding apparatus and a video decoding apparatus. For example, the CNN-based filter may be used as a substitute for the deblocking filter 182 and the SAO filter 284 of the video encoding apparatus, and may be used as a substitute for the deblocking filter 462 and the SAO filter 464 of the video decoding apparatus. While the CNN-based filter is described below based on YUV as an example of information constituting a picture, the CNN-based filter may be applied even to RGB, YCbCr, and the like. That is, in the following description, it should be understood that "YUV whose image quality is to be improved" may be "RGB whose image quality is to be improved" or "YCbCr whose image quality is to be improved."

Figure 6:
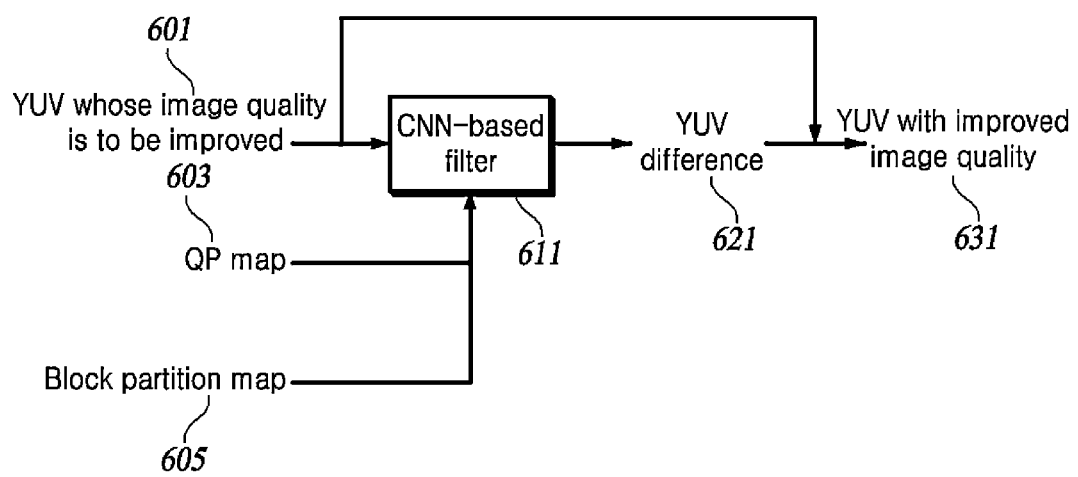
FIG. 6 is a diagram illustrating a CNN-based filter according to an embodiment of the present disclosure.

FIG. 6 is a diagram illustrating a CNN-based filter according to an embodiment of the present disclosure.

When at least one of a quantization parameter (QP) map 603 and a block partition map 605 and a YUV 601 whose image quality is to be improved are input to the input layer, a YUV difference 621 is output at the output layer. Here, the YUV 601 whose image quality is to be improved may be YUV 601 reconstructed from a bitstream received from the encoder, and represents an artificially or non-artificially damaged form of original YUV. Additionally, a hint (not shown) may also be input to the input layer.

First, in the training process, the coefficients of the CNN-based filter, that is, the coefficients of the convolution kernel are trained such that the YUV difference 621 output at the output layer becomes the difference between the original YUV and the YUV whose image quality is to be improved. Here, the convolution kernel is available in both 2D (dimension) and 3D forms. The CNN-based filter 611 is configured to improve the image quality of the input YUV, and the final output of the CNN-based filter 611 is called YUV, that is, the YUV 631 with improved image quality.

Here, the YUV whose image quality is to be improved may be filtered for each channel or may be filtered all at once.

The size of the QP map is set at the same resolution as the input YUV to be filtered, and the QP map may be filled with QP values used in a coding unit in the YUV plane, for example, a block or a sub-block. When the YUV is filtered for each channel, one map may be configured with QP values of a channel to be filtered. When the YUV is filtered at once, the QP values of the three channels may constitute three separate maps or one map having an average QP value may be configured.

As a method to improve the accuracy of the CNN technique, block mode map information useful for the training process as well as the QP map, the block partition map, and an image whose quality is to be improved may be added as hint information to the input layer. Here, the block mode map may be filled with mode values used in a coding unit, for example, a block or a sub-block. For example, the values each may be information for distinguishing whether an associated block is encoded in the intra mode or inter mode, and the information may be expressed as a number. In this case, the convolution kernel coefficients, which are a result of the training process, may be set including hints as well as data of the input layer. Basically, the input layer and the output layer should be configured identically for the training process and the inference process of the CNN technique.

Subsequently, in the inference process, the YUV with improved image quality is generated from the YUV whose image quality is to be improved, a QP map, and a block partition map by using the coefficients of the CNN-based filter obtained in the training process.

Figure 7A:
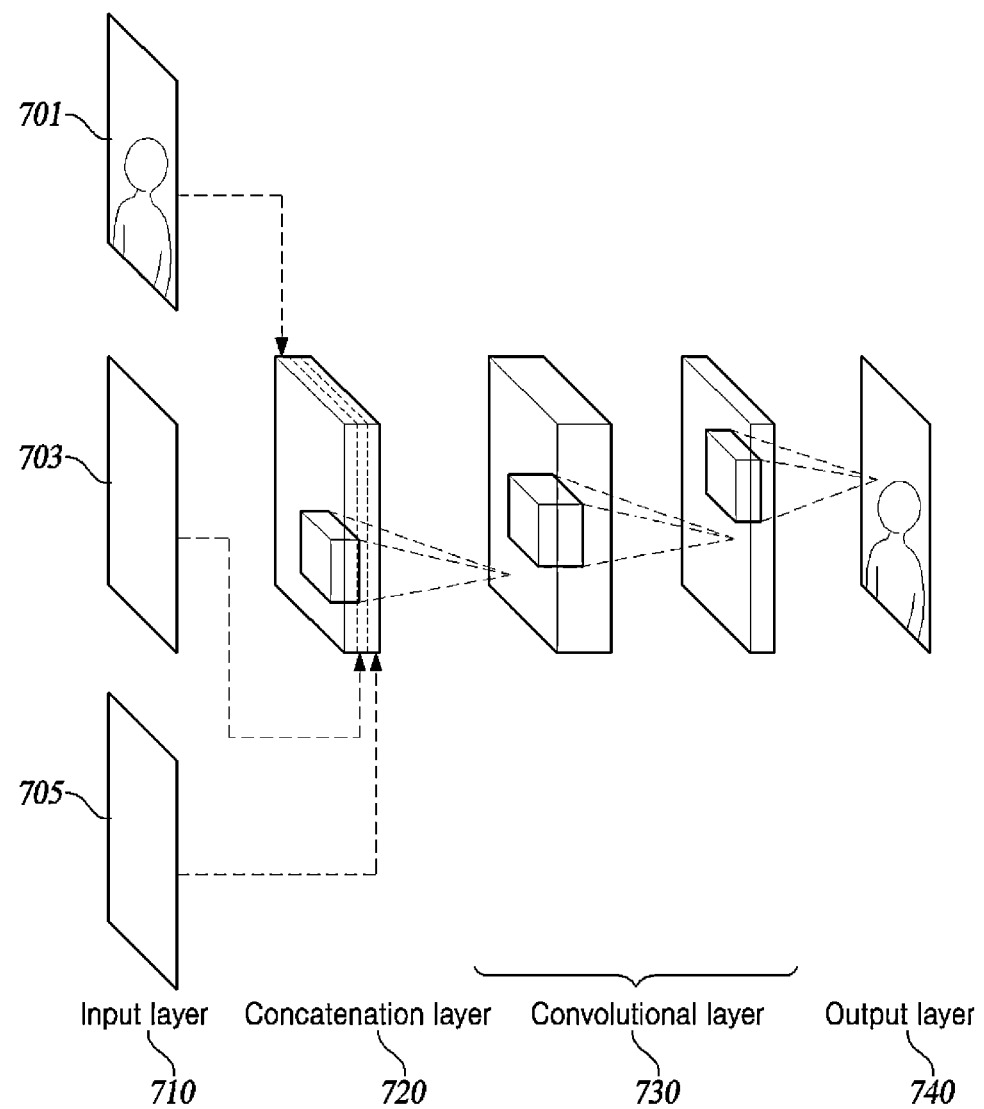
FIGS. 7A to 7C are diagrams illustrating structures of CNNs having concatenation layers at different positions according to an embodiment of the present disclosure.
Figure 7B:
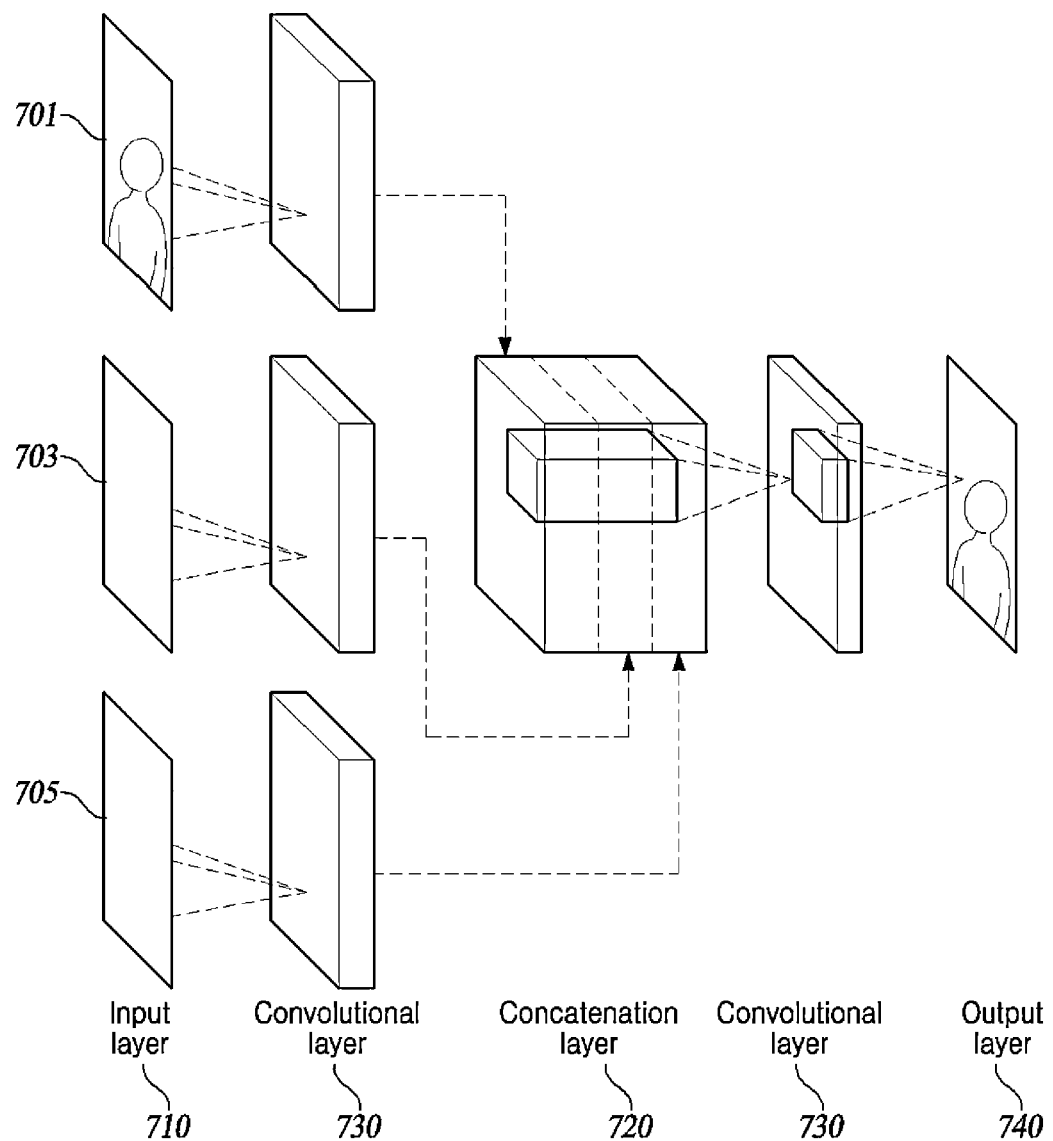
Figure 7C:
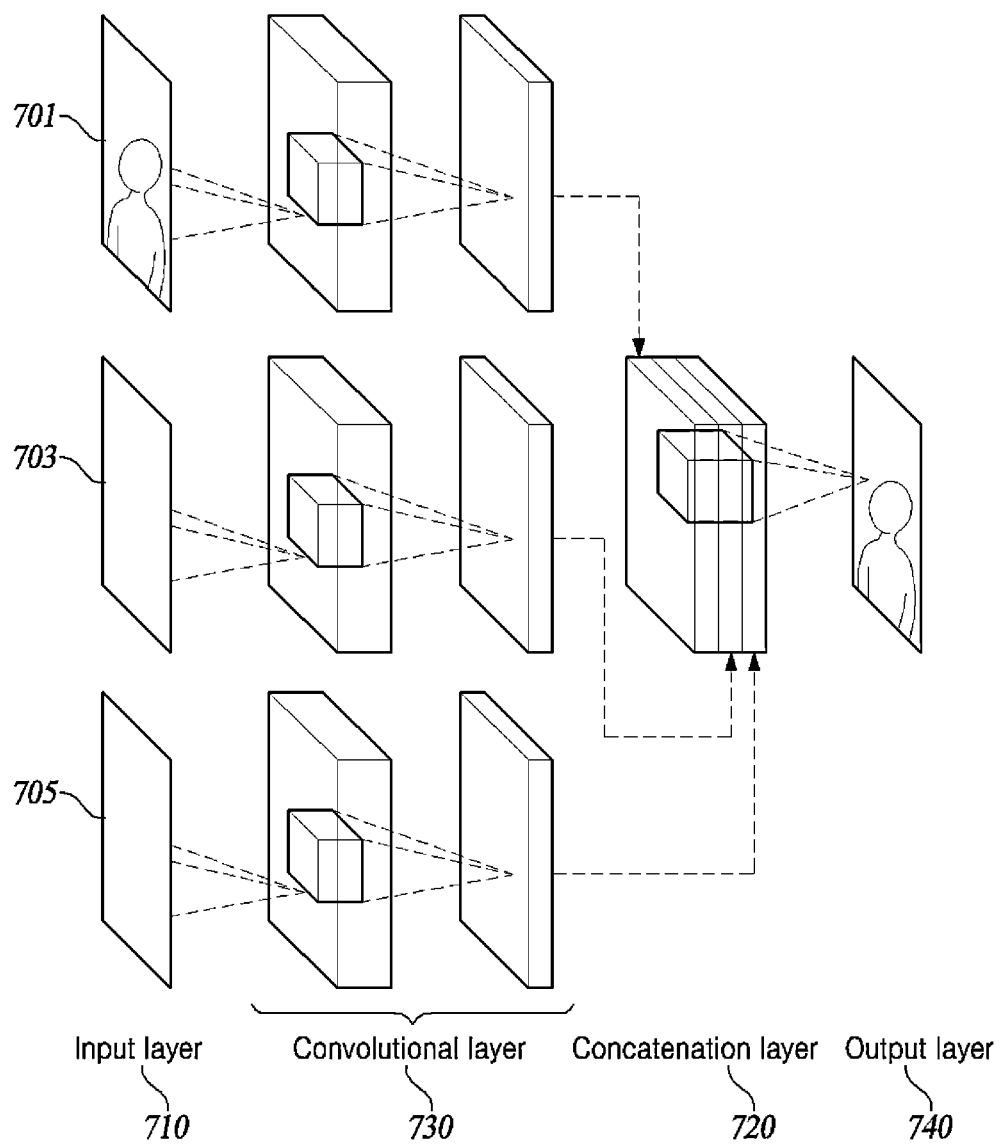

FIGS. 7A to 7C are diagrams illustrating structures of CNNs having concatenation layers at different positions according to an embodiment of the present disclosure.

Specifically, YUV 701 whose image quality is to be improved, a QP map 703, and a block partitioning map 705, which are input to an input layer 710, may be concatenated through a concatenation layer 720 during the CNN operation. However, the position of the concatenation layer 720 may be changed as illustrated in FIGS. 7A, 7B, and 7C.

FIG. 7A shows a CNN structure in which the concatenation layer 720 is positioned immediately after the input layer 710, and thus the YUV 701 whose image quality is to be improved, the QP map 703, and the block partition map 705 are concatenated immediately after being input to the input layer 710. FIG. 7B shows a CNN structure in which the concatenation layer 720 is positioned between convolutional layers 730, and FIG. 7C shows a CNN structure in which the concatenation layer 720 is positioned immediately before the output layer 740.

Figure 8A:
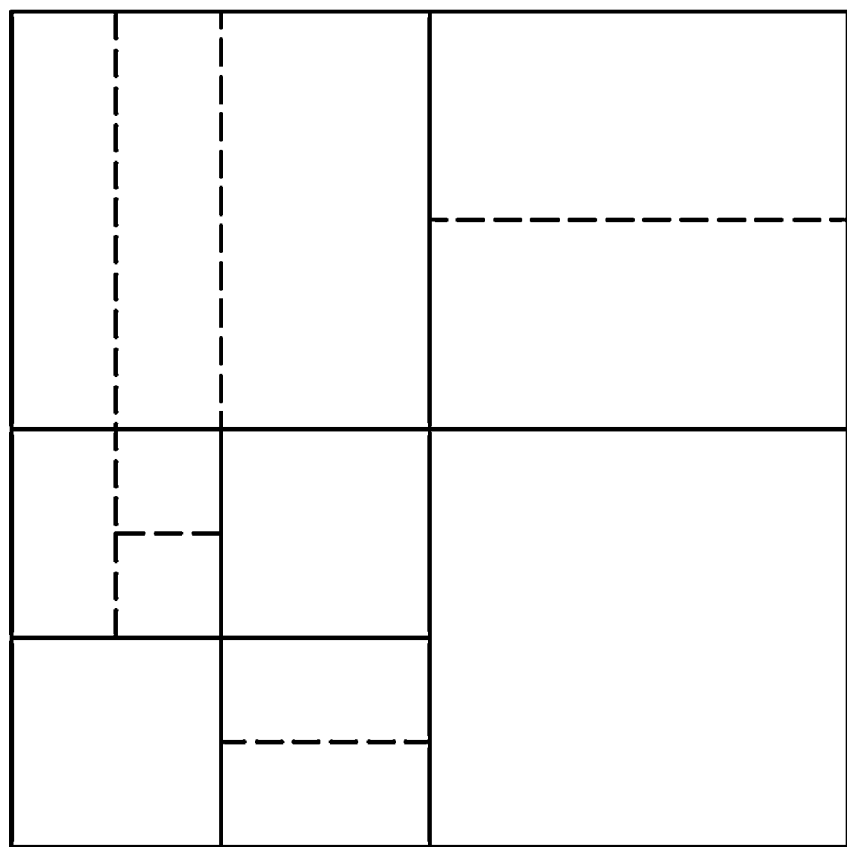
FIGS. 8A to 8C are diagrams illustrating data to be input to an input layer of a CNN according to an embodiment of the present disclosure.
Figure 8B:
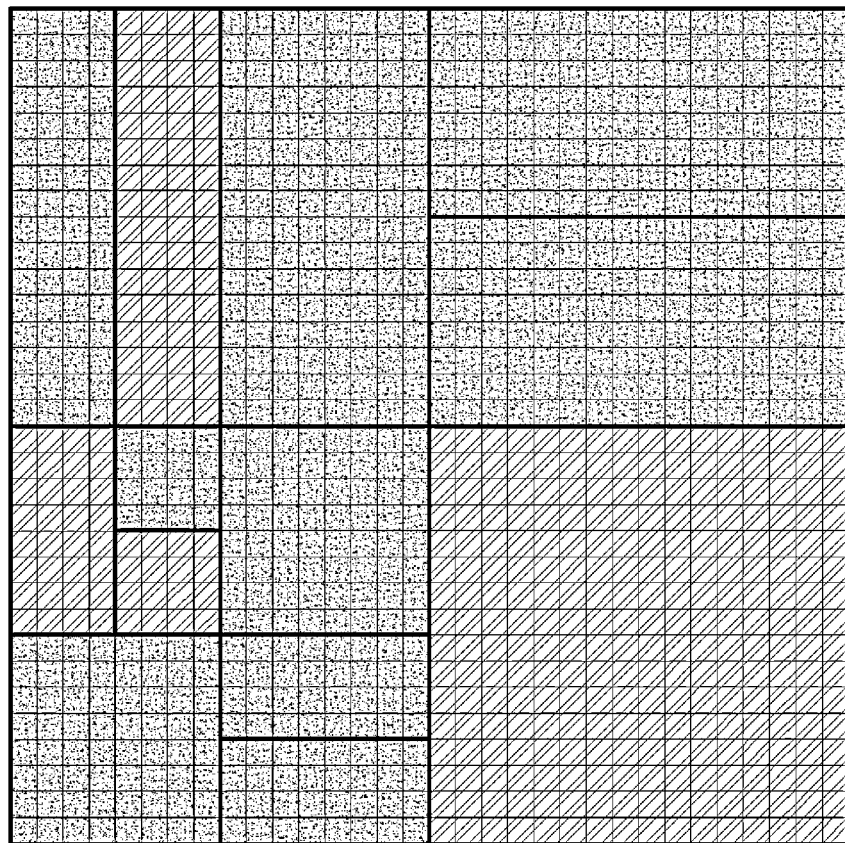
Figure 8C:
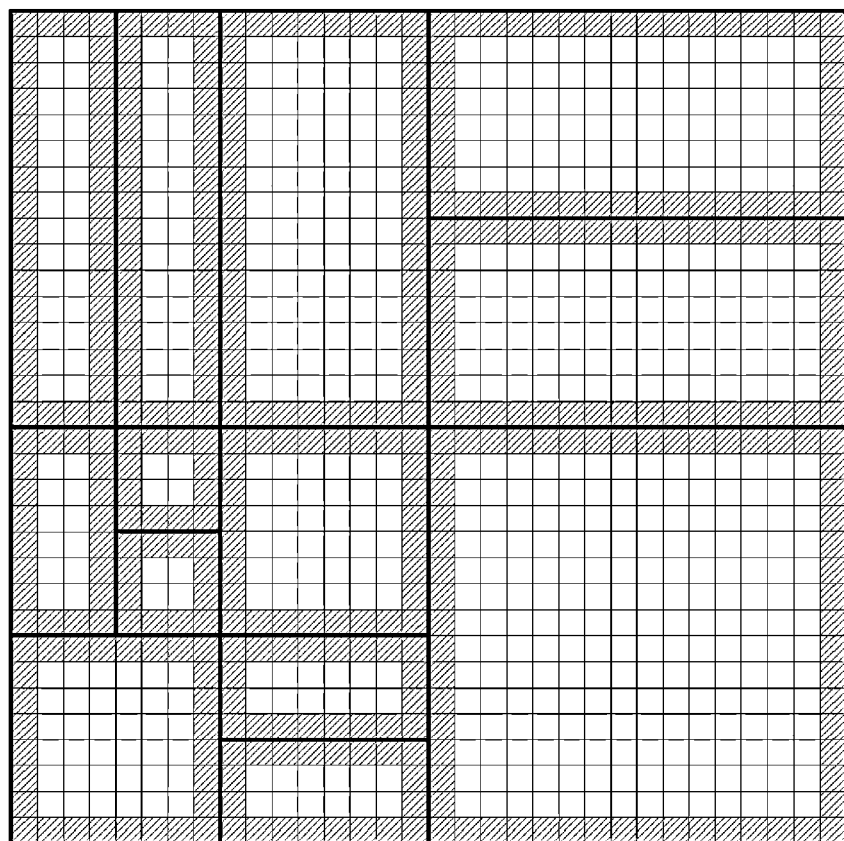

FIGS. 8A to 8C are diagrams illustrating data to be input to an input layer according to an embodiment of the present disclosure.

Specifically, FIG. 8A illustrates a Y plane (e.g., a Y coding tree block (CTB)) whose image quality is to be improved, in which pixel values of luma whose image quality is to be improved are omitted. FIG. 8B shows a QP map applied to the Y plane whose image quality is to be improved, FIG. 8C shows a block partition map of the Y plane whose image quality is to be improved.

Hereinafter, various structures of a block partition map according to an embodiment of the present disclosure will be described. The block partition map is configured to indicate how a block is split, and helps to process the partition boundary of a block and the inner region of the block differently in the training process and inference process of the CNN.

Figure 9A:
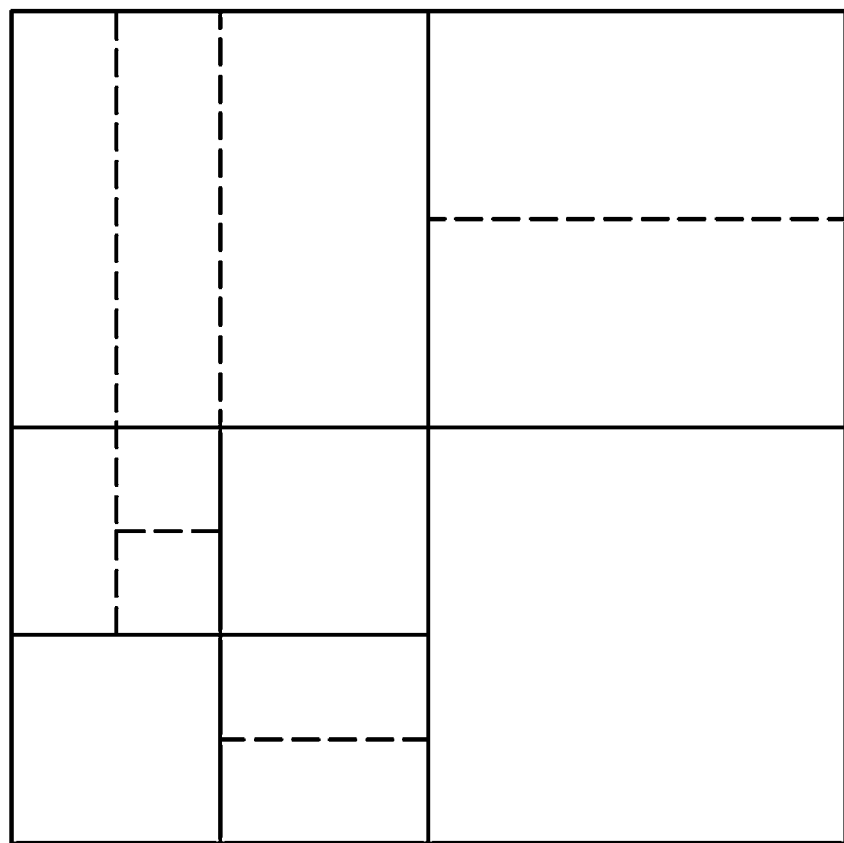
FIGS. 9A and 9B are diagrams illustrating an example of a block partitioning map according to an embodiment of the present disclosure.
Figure 9B:
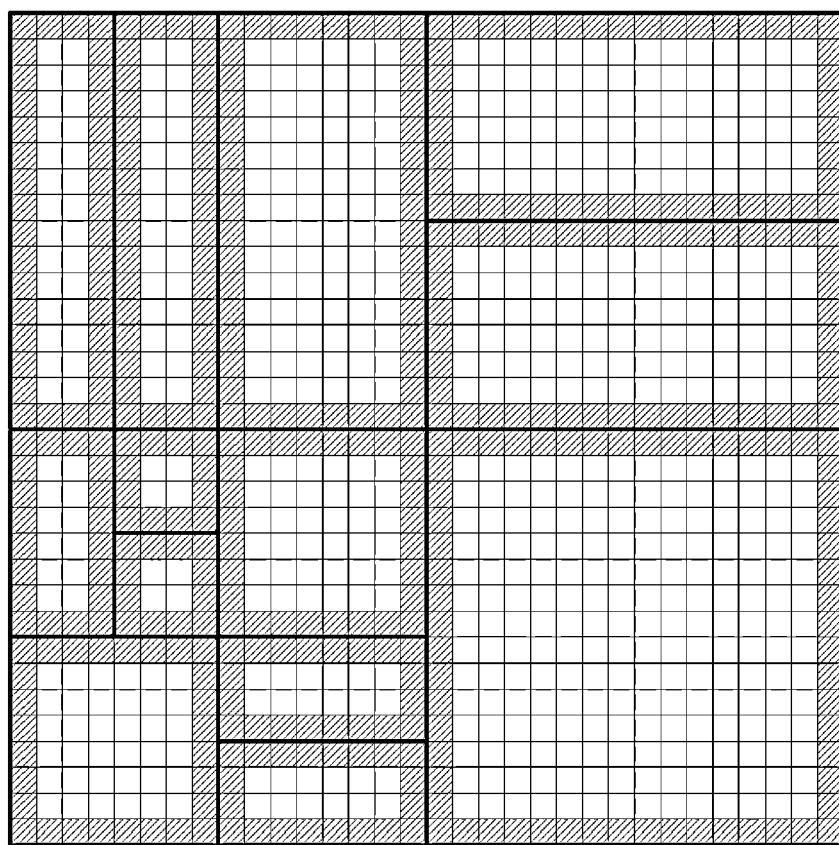

FIGS. 9A and 9B are diagrams illustrating an example of a block partitioning map according to an embodiment of the present disclosure.

The block partition map may be set at the same resolution as the YUV plane to be filtered, and be configured with values indicating how a block is split. For example, when the YUV plane is configured as a coding tree block including a plurality of coding blocks (CBs), the block partition map may indicate a partition boundary of the CBs in the coding tree block. FIG. 9A shows a coding tree block split in the manner of the quadtree plus binary tree (QTBT), and FIG. 9B shows a block partition map according to the coding tree block. Referring to FIG. 9B, in the block partition map, the boundary of a CB is indicated by '1', and the interior of the CB is indicated by '0'.

Figure 10A:
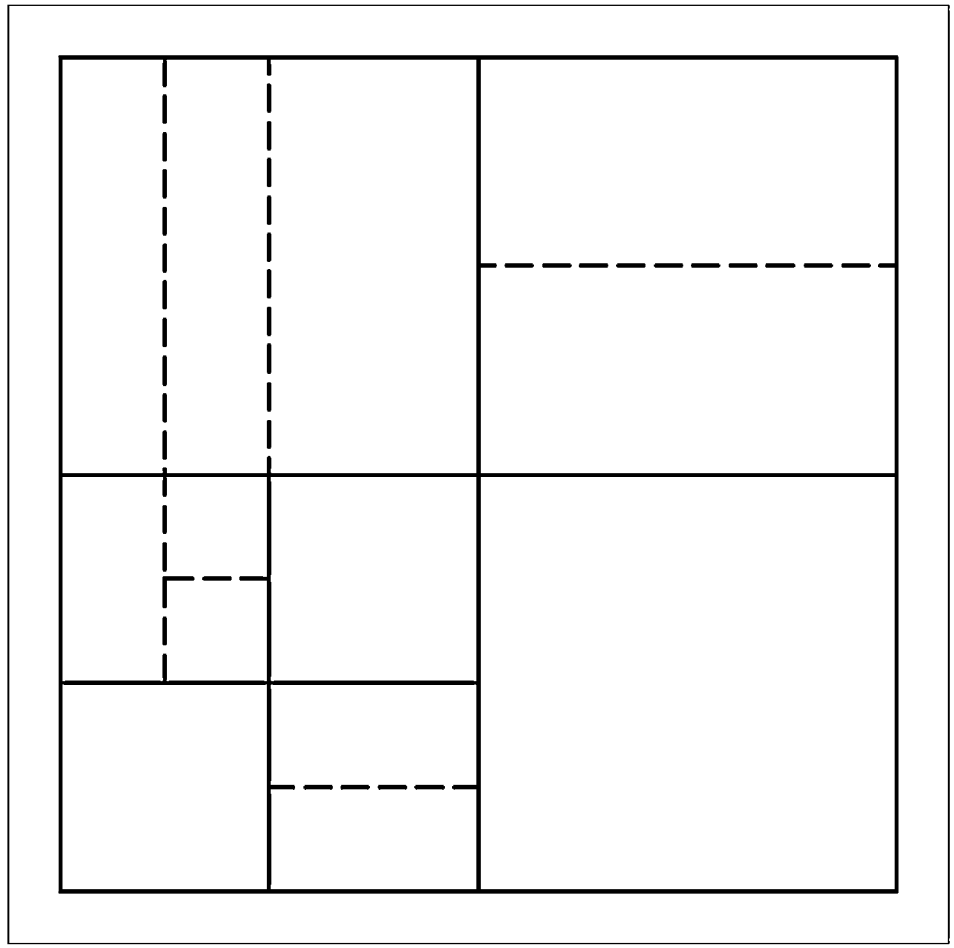
FIGS. 10A to 10C are diagrams illustrating another example of a block partitioning map according to an embodiment of the present disclosure.
Figure 10B:
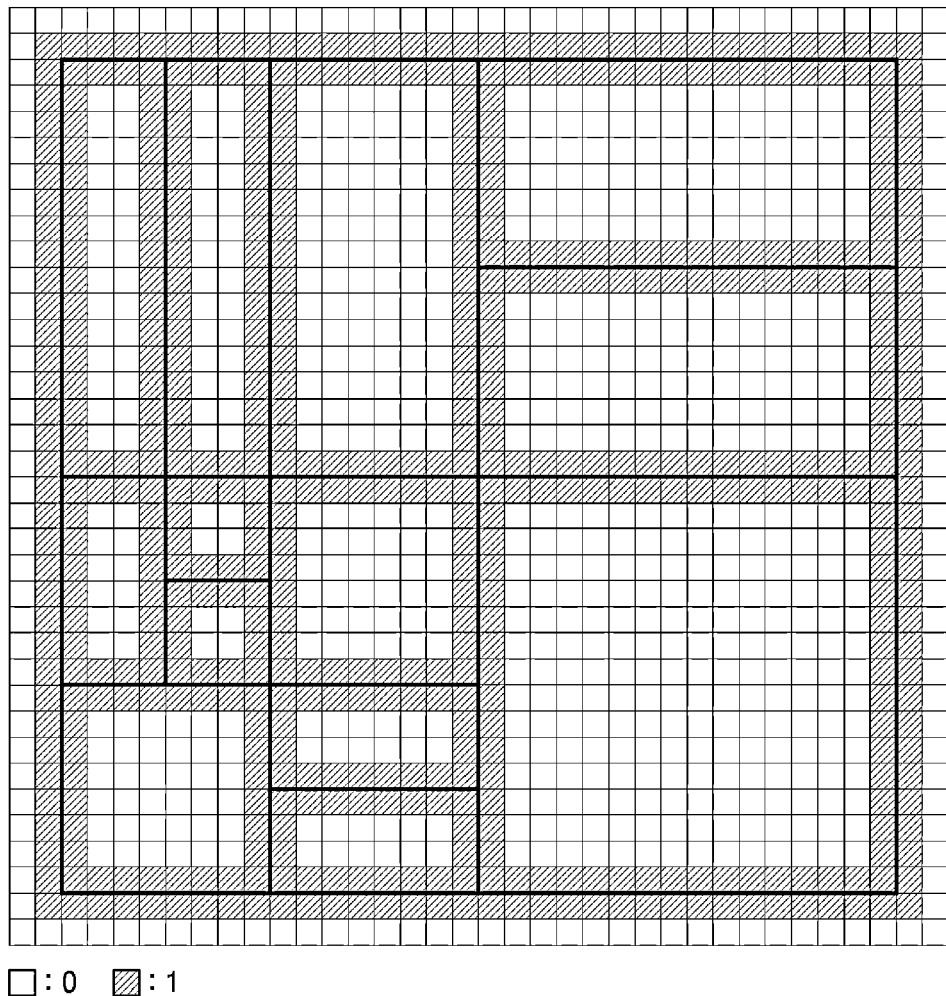
Figure 10C:
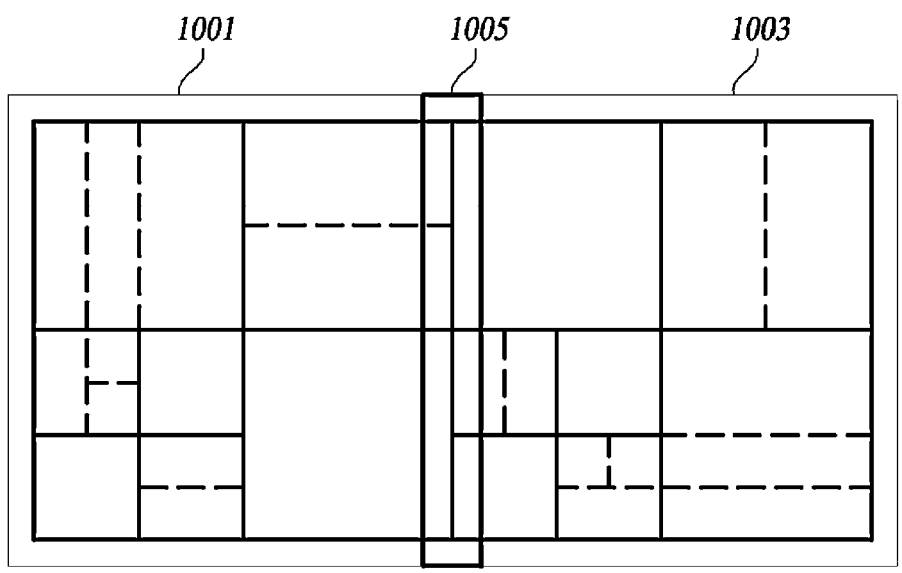

FIGS. 10A to 10B are diagrams illustrating another example of a block partitioning map according to an embodiment of the present disclosure.

In FIGS. 10A to 10B, when the YUV plane is configured as a coding tree block, blocking deterioration processing for a boundary of the coding tree block may not be possible, and thus an extra region a may be added to the YUV plane. While FIGS. 10A and 10B show an example in which 2 pixels are set as the extra region a, other values may be set. In addition, the boundary of the coding tree block may be indicated by the extra region, and whether or not a block is split may be indicated for a region outside the coding tree block. When blocks including the extra region are filtered, there may be a region overlapping with another adjacent coding tree block after the filtering, and the overlapping region may be processed with an average value. Specifically, referring to FIG. 10C, when coding tree blocks 1001 and 1003 including an extra region are adjacent to each other, a region 1005 where the blocks overlap with each other is produced. The overlapping region 1005 may be set to an average value of the coding tree blocks 1001 and 1003 adjacent to each other.

Figure 11A:
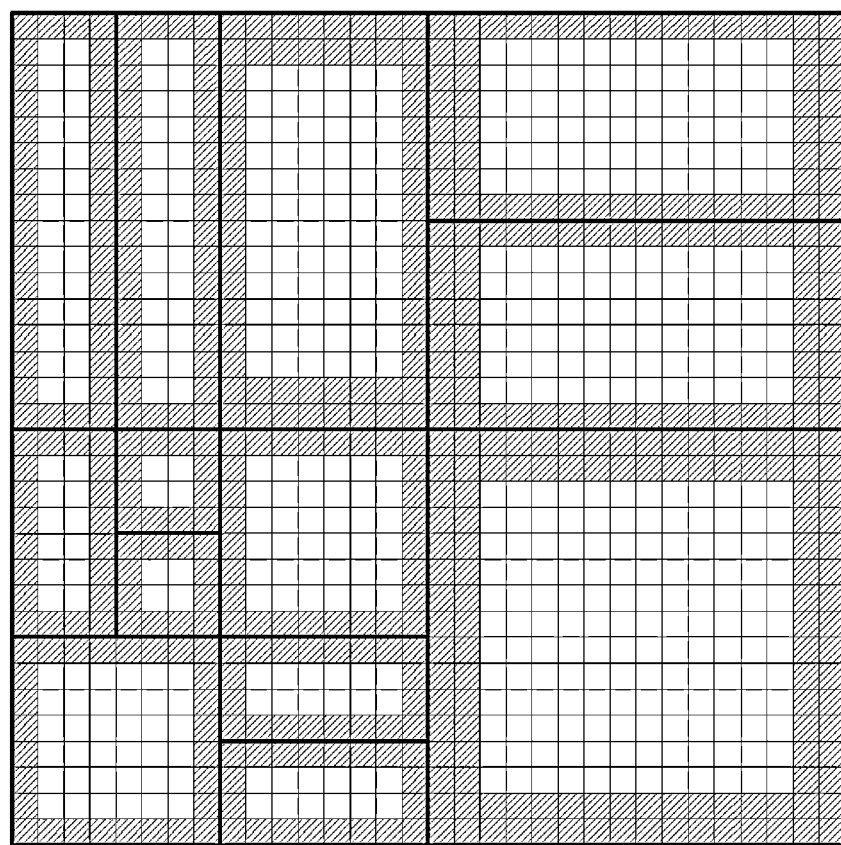
FIGS. 11A to 11C are diagrams illustrating a block partitioning map for adjusting the intensity of deblocking according to an embodiment of the present disclosure.
Figure 11B:
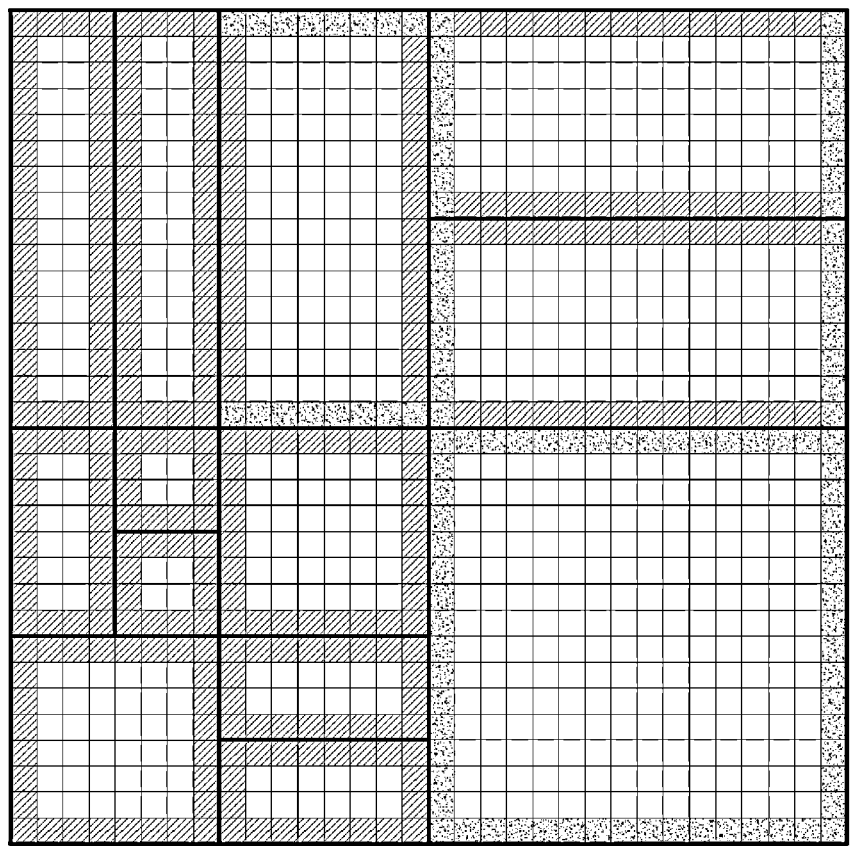
Figure 11C:
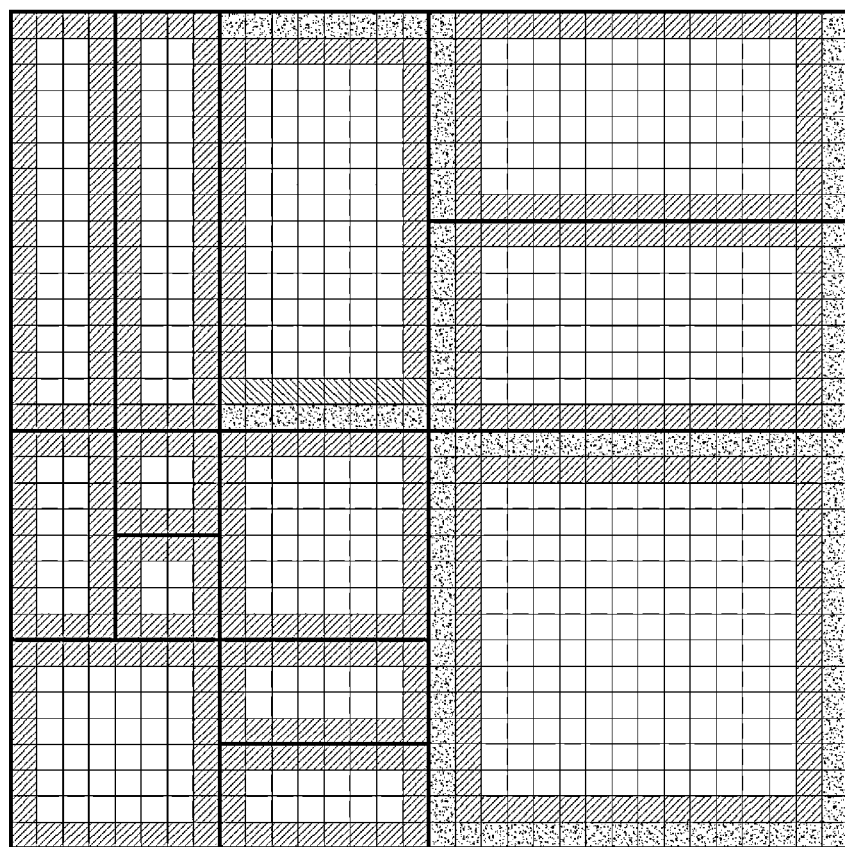

FIGS. 11A to 11C are diagrams illustrating a block partitioning map for adjusting the intensity of deblocking according to an embodiment of the present disclosure.

In the previous embodiment, the boundary of the coding block is distinguished by one pixel. When the value of the one pixel is 0, this indicates the inside of the coding block. When the value is 1, this indicates the boundary of the coding block.

In FIG. 11A, in order to control the intensity of deblocking, the boundary of a coding block is indicated by the number of pixels (or the width of pixels, a luma sample line, a luma sample length, etc.). The number of pixels may be determined by at least one of the size of the coding block, the value of a QP, and a coding mode. For example, as shown in FIG. 11A, when the coding block is large, the number of pixels may be set to 2. When the coding block is small, the number of pixels may be set to 1. When the value of the QP is large, the number of pixels may be set to be large. When the value of the QP is small, the number of pixels may be set to be small. As another example, when the encoding mode is the intra mode, the number of the pixels may be set to be large. When the encoding mode is the inter mode, the number of the pixels may be set to be small. All the values may be set in the opposite way.

The number of pixels may mean the number of pixels positioned on a block boundary that is to be updated through filtering. For example, when a 3 pixel value in a block positioned on a block boundary line is to be updated, the block boundary may be indicated by 3 pixels in the block partition map. As another example, the number of pixels may mean the number of pixels positioned on a block boundary line to be referenced for filtering. For example, when filtering is to be performed with reference to a 4 pixel value in a block positioned on a block boundary line, the block boundary may be indicated by 4 pixels in the block partition map.

In FIG. 11B, boundary values of coding blocks are indicated differently in order to control the intensity of deblocking. The boundary value of a coding block may be determined by at least one of the size of the coding block, the value of a QP, a coding mode, the number of pixels to be updated, and the number of pixels to be referenced for filtering. As shown in FIG. 7A, when the coding block is large, the value of the QP is large, or the encoding mode is the intra mode, the boundary value of the coding block may be set to be large. Conversely, when the coding block is small, the value of the QP is small, or the encoding mode is the inter mode, the boundary value of the coding block may be set to be small. All these values may be set in the opposite way.

FIG. 11C illustrates indicating the number of pixels at the boundary of the coding block and the boundary value of the coding block to adjust the intensity of deblocking. The details are the same as those described with reference to FIGS. 11A and 11B, and thus description thereof is omitted.

The block partition map set as described above is used in the training process to help the CNN filter to operate as a strong deblocking filter.

Figure 12:
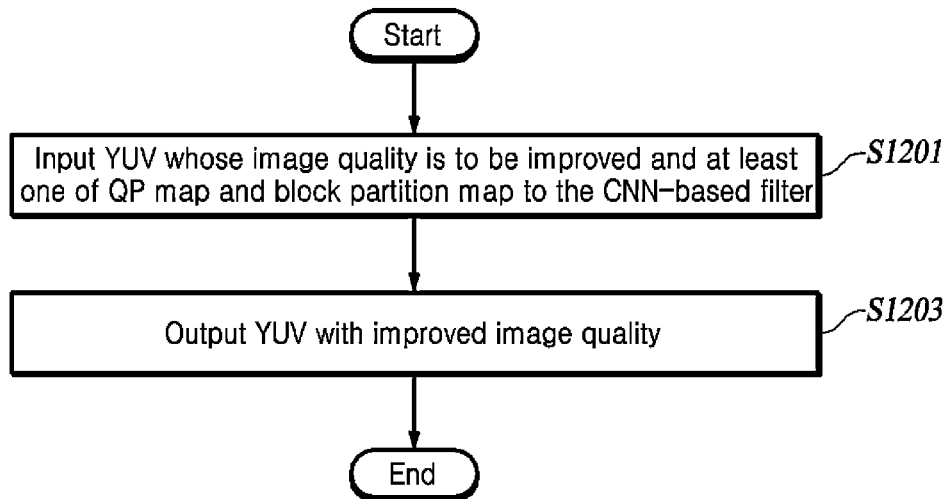
FIG. 12 is a flowchart illustrating decoding of a video using a CNN-based filter according to an embodiment of the present disclosure.

FIG. 12 is a flowchart illustrating decoding of a video using a CNN-based filter according to an embodiment of the present disclosure.

At least one of a QP map and a block partition map and YUV whose image quality is to be improved are input to the CNN-based filter (S1201). The QP map may be set at the same resolution as the YUV whose image quality is to be improved. The block partition map may indicate different values for the partitioned boundary of a block and the inner region of the block. In the block partition map, the number and values of pixels representing the partitioned boundary of the block may be determined by at least one of the size of the coding block, the value of a QP, a coding mode, the number of pixels to be updated, and the number of pixels to be referenced for filtering.

YUV with improved image quality is output based on the coefficients of the CNN-based filter which has been trained using the YUV whose image quality is to be improved, the QP map, and the block partition map as inputs and the original YUV as the final output (S1203). When a hint such as a block mode map is additionally input to the CNN-based filter, the coefficients of the CNN-based filter are also trained by providing the hint as an additional input.

Figure 13:
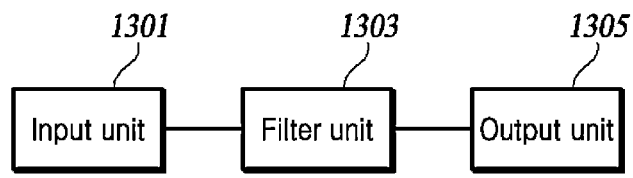
FIG. 13 is a diagram schematically illustrating the configuration of a video decoding apparatus according to an embodiment of the present disclosure.

FIG. 13 is a diagram schematically illustrating the configuration of a video decoding apparatus according to an embodiment of the present disclosure. The apparatus illustrated in FIG. 13 may be, for example, an element or module corresponding to the filter unit 460 of FIG. 4.

The video decoding apparatus may include an input unit 1301, a filter unit 1303, and an output unit 1305. The apparatus may also include other elements, but descriptions of elements not directly related to the present disclosure will be omitted.

At least one of a QP map and a block partition map and YUV whose image quality is to be improved are input to the input unit 1301. The QP map may be set at the same resolution as the YUV whose image quality is to be improved. The block partition map may indicate different values for the partitioned boundary of a block and the inner region of the block. In the block partition map, the number and values of pixels representing the partitioned boundary of the block may be determined by at least one of the size of the coding block, the value of a QP, and a coding mode.

The filter unit 1303 applies the trained coefficients of the CNN-based filter to at least one of the QP map and the block partition map and the YUV whose image quality is to be improved that are input to the input unit 1301.

The output unit 1305 outputs YUV with the improved image quality which is obtained by applying the trained coefficients of the CNN-based filter to the at least one of the input QP map and the block partition map and the YUV whose image quality is to be improved that are input.

In this example, the input unit 1301, the filter unit 1303, and the output unit 1305 are described separately, but they may be implemented by being integrated into a single element by dividing a single element into multiple elements.

2. CNN-Based Intra-Prediction (1)—CNN-Based Generation Of Prediction Block

Some techniques of the present disclosure relate to performing CNN-based intra-prediction. Hereinafter, a technique of performing CNN-based intra-prediction will be described with reference to FIGS. 14 to 21.

Figure 14:
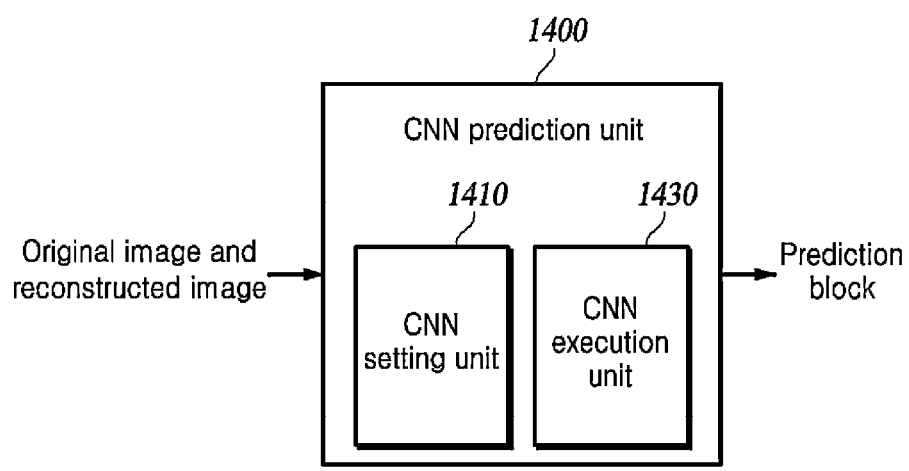
FIG. 14 is a block diagram showing the configuration of a CNN predictor that may be included in a video encoding apparatus according to an embodiment of the present disclosure.

FIG. 14 is a block diagram showing the configuration of a CNN predictor that may be included in a video encoding apparatus according to an embodiment of the present disclosure. The CNN predictor 1400 of FIG. 14 may be, for example, the intra-predictor 122 of the video encoding apparatus illustrated in FIG. 1 or a module included in the intra-predictor 122.

Referring to FIG. 14, the CNN predictor 1400 may perform CNN-based intra-prediction on reconstructs an encoding target image (i.e., the original image) transmitted from the block splitter (e.g., 110 in FIG. 1) and the reconstructed image transmitted from the adder (e.g., 170 of FIG. 1) to generate a prediction block. To this end, the CNN predictor 1400 may include a CNN setting unit 1410 and a CNN execution unit 1430.

The CNN setting unit 1410 may calculate filter coefficients, that is, coefficients of a convolution kernel, by performing supervised learning using a CNN composed of a plurality of layers. Here, the structure of the CNN is configured as described above with reference to FIG. 5. The CNN may further include an upsampling layer or a pooling layer to adjust the size of the layers.

The video data input to the input layer (hereinafter referred to as "input data") may be composed of a reference region encoded before the current block.

The reference region may include at least one block (or region) of a neighboring region adjacent to the current block and a block of a component (hereinafter referred to as "current block of a different channel") encoded earlier than the block of a component to be encoded among the luma and chroma blocks constituting the current block. Here, the neighboring region may be a region of the same channel as the current block or a region of a different channel. Further, the neighboring region may be set in units of blocks (i.e., neighboring blocks) or may be set in units of pixels (i.e., neighboring pixels or neighboring lines). The reference region may further include a new region (i.e., average blocks, average pixels, or average lines) generated by averaging pixel values of the neighboring region.

Figure 15:
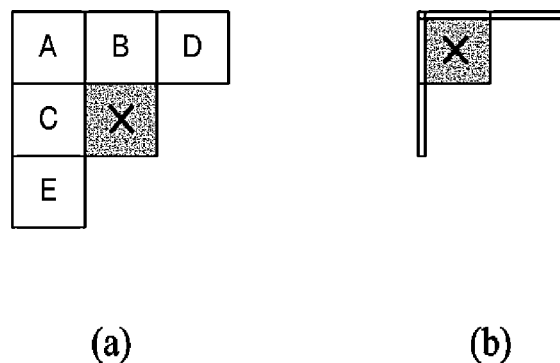
FIG. 15 is an exemplary diagram of a neighboring region that may be used as input data of a CNN.

FIG. 15 is an exemplary diagram of a neighboring region that may be used as input data of a CNN. Specifically, FIG. 15(a) shows a neighboring region in a block unit, and FIG. 15(b) shows a neighboring region in a pixel unit.

Referring to FIG. 15(a), the reference region in units of blocks, that is, neighboring blocks, may include a left block C, a top block B, a top-right block D, a bottom-left block E, and a top-left block A, which are adjacent to a current block X. In this specification, the original block (i.e., unencoded block), prediction block, and reconstructed block of a neighboring block are denoted differently. For example, for the top-left block A, the original block is denoted by 'Ao', the prediction block is denoted by 'Ap', and the reconstructed block is denoted by 'Ar'. In addition, the average block obtained by averaging the pixel values of the neighboring blocks A, B, C, D, and E is denoted by 'F'.

Referring to FIG. 15(b), the reference region in units of pixels may include pixels of '1×1' and lines of '1×n' or 'n×1' adjacent to the current block X. For reference, the reference region in units of blocks has a wider application range of the convolution kernel than the reference region in units of pixels, and may accordingly improve the accuracy of the training process and inference process of the CNN. Hereinafter, for simplicity, the present embodiment will be described on the assumption that the reference region is in units of blocks.

In the YCbCr 4:2:0 or 4:2:2 format, the chroma block may be used in the original size thereof, or may be used after being up-scaled using an upsampling layer so as to have the same size as the luma block.

When neighboring blocks of a channel different from that of the current block are input to the input layer, not only the neighboring blocks Ar, Br, Cr, Dr, and Er shown in FIG. 15(a), but also one or more blocks (not shown) among the right block, the bottom block and the bottom-right block of the current block X may be input to the input layer. For example, when the current block is a chroma block, accuracy of intra-prediction may be improved by adding, as input data, one or more blocks among the right block, the bottom block, and the bottom-right block of the current block of the luma channel that has already been encoded.

Figure 16:
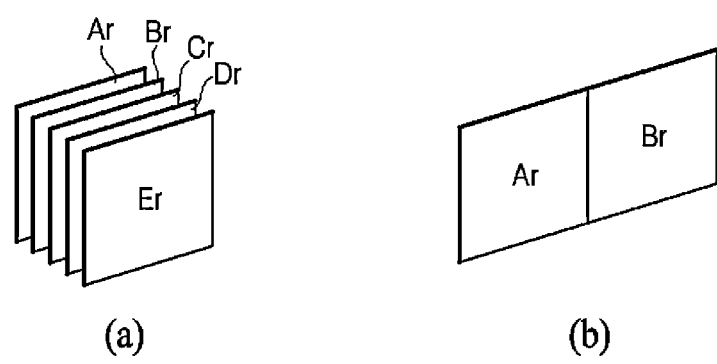
FIG. 16 is a diagram illustrating an example of configuring an input layer of a CNN from a plurality of neighboring blocks.

FIG. 16 is a diagram illustrating an example of configuring an input layer of a CNN from a plurality of neighboring blocks.

The input layer may be composed of a plurality of layers for the respective neighboring blocks Ar, Br, Cr, Dr, and Er as shown in FIG. 16(a), or a plurality of neighboring blocks Ar and Br may be integrated and configured as a single layer as shown in FIG. 16(b).

Referring back to FIG. 14, the video data output from the output layer (hereinafter referred to as "output data") may be a prediction block of the current block. In this case, the output label may be composed of an original block (i.e., an unencoded block) of the current block for supervised learning based on comparison with output data.

Table 1 shows some example configurations of the CNN layer. However, it should be noted that this is merely an example, and is not intended to limit embodiments to which the techniques of the present disclosure are applicable.

TABLE 1

| CNN layer | Input layer | Output layer | |
| --- | --- | --- | --- |
| example# | Data | Data | Lable |
| Example 1 | Neighboring blocks of the same channel as the current block | Prediction block of current block | Original block of current block |
| Example 2 | Current block of a channel different from that of a current block | Prediction block of current block | Original block of current block |
| Example 3 | Neighboring blocks of the same channel as the current block and an average block thereof<br>Current block of a different channel | Prediction block of current block | Original block of current block |
| Example 4 | Neighboring blocks of the same channel as the current block and an average block thereof<br>Current block of a different channel<br>Neighboring blocks of the different channel and an average block thereof | Prediction block of current block | Original block of current block |

Referring to Table 1, in the configuration examples of the CNN layer, the data of the input layer may be configured in various combinations, the data of the output layer is a prediction block of the current block, and the label of the output layer is the original block of the current block. The input data and output data should be the same in the training process and the inference process of the CNN.

The CNN setting unit 1410 may set hint information to minimize errors between the output data and the output label and improve the accuracy of intra-prediction. Here, the hint information may include at least one of directionality information about intra-prediction, a quantization parameter (QP) of the current block or reference region, and an absolute sum (i.e., the amount of the residual) of transform coefficients or residual signals of a neighboring block. The hint information may be transmitted to the video decoding apparatus through a bitstream and be used in decoding the current block.

Figure 17:
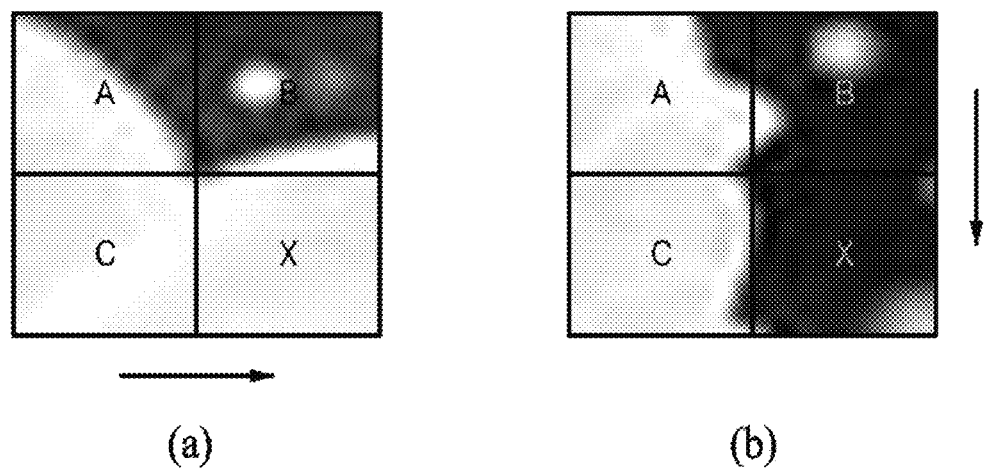
FIG. 17 exemplarily illustrates a prediction direction suitable for a current block in terms of pixel values of neighboring blocks.

FIG. 17 exemplarily illustrates a prediction direction suitable for a current block in light of the shape of pixel values of neighboring blocks.

In FIG. 17, the neighboring blocks of the current block X includes a top-left block A, a top block B, and a left block C.

Referring to FIG. 17(a), regarding the pixel values of the neighboring blocks A, B, and C, about half of the top-left block A is white, and most of the left block C is white. However, most of the top block B has a color other than white. Considering that most of the pixels of the current block X have a value for white, performing intra-prediction in the horizontal direction may increase the prediction accuracy most.

Referring to FIG. 17(b), regarding the pixel values of the neighboring blocks A, B, and C, most of the top-left block A and the left block C are white, but most of the top block B has a color other than white. Considering that most of the pixels of the current block X have a value for a color other than white, performing intra-prediction in the vertical direction may improve the prediction accuracy most.

Therefore, the CNN predictor 1400 according to the present embodiment is intended to improve the accuracy of intra-prediction by using the directionality information about the intra-prediction as hint information for the training process and the inference process of the CNN.

The directionality information about the intra-prediction may be intra-prediction mode numbers indicating 65 directional modes and a non-directional mode illustrated in FIG. 3. For example, the hint information including one or more pieces of prediction directionality information may be encoded by the encoder 150 of the video encoding apparatus of FIG. 1 and transmitted to the video decoding apparatus of FIG. 4.

Here, various methods may be used to minimize the amount of bits required to encode the hint information. For example, the CNN setting unit 1410 may select some directions (e.g., horizontal direction, vertical direction, diagonal down-right direction, diagonal up-right direction, etc.) from among the 65 prediction directions as representative directions, and set one of the selected representative directions as hint information for intra-prediction of the current block. Then, the CNN setting unit 1410 may transmit the hint information to the video decoding apparatus in a manner similar to that of the most probable mode (MPM).

The hint information may include a quantization parameter (QP) indicating the intensity of quantization. Here, the QP may be a QP value applied to the quantization operation of the current block or reference region.

The hint information may include the amount of the residual. Here, the amount of the residual may be the sum of the absolute values of the transform coefficients of the neighboring block or the residual signals.

Figure 18:
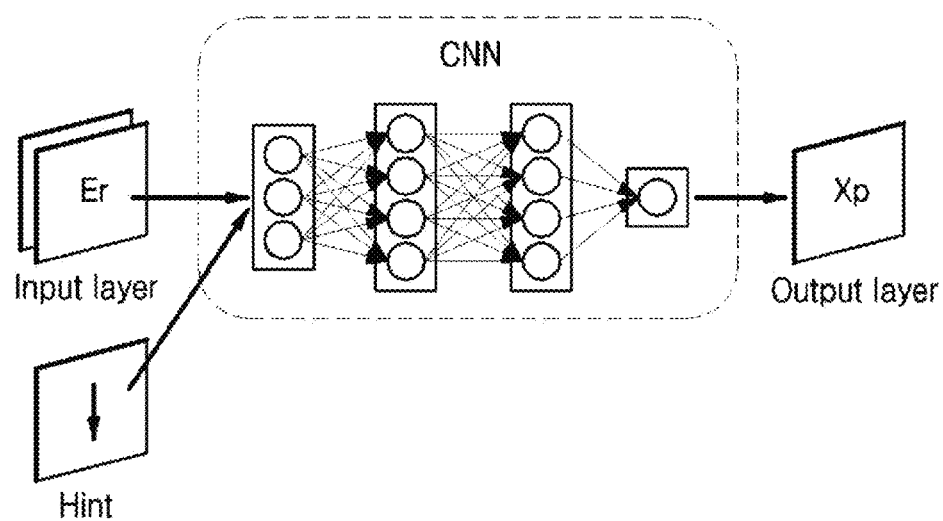
FIG. 18 is an exemplary diagram of a layer configuration of a CNN including hint information.

The hint information may be composed of one or more maps and be concatenated to a layer of the CNN. The map for the hint information may be concatenated at various positions between the input layer and the output layer. For example, the map for the hint information may be concatenated immediately after the input layer as shown in FIG. 18, or concatenated immediately before the output layer.

The input data may be configured in various combinations according to the directionality of intra-prediction. For example, when the directionality of intra-prediction is a horizontal direction, the input data may be composed of one or more blocks selected from among the left neighboring blocks Ar, Cr, and Er of the current block X and an average block thereof. On the other hand, when the directionality of intra-prediction is a vertical direction, the input data may be composed of one or more blocks selected from among the top neighboring blocks Ar, Br, and Dr of the current block X and the average block thereof.

The CNN setting unit 1410 may calculate filter coefficients through an iterative training process using an error backpropagation algorithm to minimize an error between the output data and the output label. Specifically, the errors between the output data and the output label may be propagated in the reverse direction from the output layer of the CNN to the input layer via the hidden layer. In the propagation operation of the error, connection weights between nodes may be updated so as to reduce the error. Then, the CNN setting unit 1410 may calculate the filter coefficients by repeating the training process of the CNN using the error backpropagation algorithm until the error becomes less than a predetermined threshold.

The filter coefficients calculation operation described above may be performed on a basis of a predetermined unit (e.g., CU, CTU, slice, frame, or sequence (group of frames)). For example, the CNN setting unit 1410 may calculate filter coefficients for each current block or each frame.

When filter coefficients are calculated on the frame-by-frame basis, filter coefficients for a certain frame may be commonly used for intra-prediction of a plurality of coding blocks included in the certain frame. In this case, there may be a plurality of pieces of prediction directionality information, which is a type of hint information. For example, when the intra-prediction directionality information is composed of one map, the one map may contain a plurality of directionality values.

The information about the calculated filter coefficients may be transmitted to the video decoding apparatus through a bitstream and used for the video decoding operation.

The CNN setting unit 1410 may construct multiple sets of filter coefficients by pre-calculating filter coefficients using predetermined sample images. In this case, the CNN setting unit 1410 may set one set of filter coefficients selected from the multiple sets according to a predetermined criterion as filter coefficients for the current block. For example, the CNN setting unit 1410 may select one set of filter coefficients from the multiple sets based on the similarity of pixel values between the current block and the sample images. Alternatively, the CNN setting unit 1410 may select, from the multiple set, a set of filter coefficients closest to the filter coefficients calculated through one training process. Filter coefficient selection information, for example, index information, may be transmitted to the video decoding apparatus through a bitstream and used for the video decoding operation.

While the CNN setting unit 1410 is illustrated in FIG. 14 as being included in the CNN predictor 1400, it should be noted that this is merely an example, and embodiments are not limited thereto. That is, the CNN setting unit 1410 may be implemented as a unit separate from the CNN predictor 1400, or integrated with the CNN execution unit 1430 and implemented as a single unit.

The CNN execution unit 1430 may perform a CNN-based inference process on the input data using the filter coefficients set by the CNN setting unit 1410, that is, the coefficient values of the convolution kernel, to generate output data, that is, a prediction block for the current block. Then, the generated prediction block may be transmitted to the subtractor of the video encoding apparatus, and be used to generate a residual block from the current block.

Figure 19:
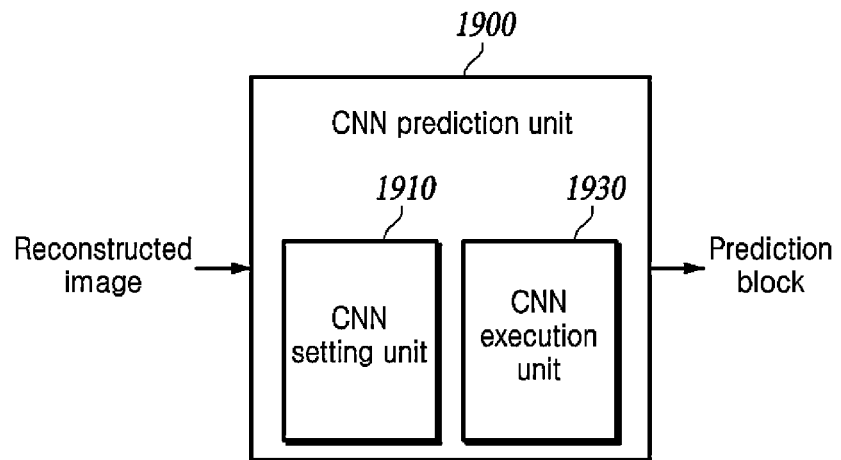
FIG. 19 is a block diagram illustrating the configuration of a CNN predictor that may be included in a video decoding apparatus according to an embodiment of the present disclosure.

FIG. 19 is a block diagram illustrating the configuration of a CNN predictor that may be included in a video decoding apparatus according to an embodiment of the present disclosure. The CNN predictor 1900 of FIG. 19 may be, for example, the intra-predictor 442 of the video decoding apparatus illustrated in FIG. 4 or a module included in the intra-predictor 442.

The CNN predictor 1900 of FIG. 19 differs from the CNN predictor 1400 of FIG. 14 only in the method of setting the input signal and filter coefficients, that is, the coefficient values of the convolution kernel, and description of details described above will be omitted or simplified.

Referring to FIG. 19, the CNN predictor 1900 may generate a prediction block by performing CNN-based intra-prediction based on a reconstructed image. To this end, the CNN predictor 1900 may include a CNN setting unit 1910 and a CNN execution unit 1930.

The structure of the CNN is configured as described above with reference to FIG. 5. The CNN may further include an upsampling layer or a pooling layer to adjust the size of the layers.

The image data input to the input layer (hereinafter referred to as "input data") may be configured with a reference region encoded before the current block.

The reference region may include at least one block (or region) among a neighboring region adjacent to the current block and a block of a component (hereinafter referred to as "current block of another channel") decoded earlier than the block of a component to be decoded between the luma and chroma blocks constituting the current block. Here, the neighboring region may be a region of the same channel as the current block or a region of another channel. Further, the neighboring region may be configured in units of blocks (i.e., neighboring blocks) or may be configured in units of pixels (i.e., neighboring pixels or neighboring lines).

The reference region may further include a new region (i.e., average blocks, average pixels, or average lines) generated by averaging pixel values of the neighboring region. For example, the input data may be composed of neighboring blocks of the same channel as the current block, an average block thereof, and a current block of a different channel.

Hereinafter, for simplicity, the present embodiment will be described on the assumption that the reference region is in units of blocks.

As described above with reference to FIG. 16, the input layer may include a plurality of layers for each of the neighboring blocks, or a plurality of neighboring blocks may be integrated and configured as one layer.

The image data output from the output layer (hereinafter referred to as "output data") may be a prediction block of the current block.

Some configuration examples of the CNN layer are as described above with reference to Table 1. However, it should be noted that this is merely an example and embodiments are not limited thereto.

The CNN setting unit 1910 may construct one or more maps using hint information transmitted from the video encoding apparatus, and then concatenate the same at various positions between the input layer and the output layer.

The hint information, which is information for improving the accuracy of intra-prediction, may include at least one of prediction directionality information, a quantization parameter (QP) of the current block or reference region, and an absolute sum (i.e., the amount of the residual) of transform coefficients or residual signals of a neighboring block.

The prediction directionality information included in the hint information may be intra-prediction mode numbers indicating 65 directional modes and a non-directional mode, or index information indicating one of one or more representative directions selected from among the 65 directional modes.

The input data may be configured in various combinations according to the directionality of intra-prediction. For example, when the directionality of intra-prediction is a horizontal direction, the input data may be composed of one or more blocks selected from among the left neighboring blocks of the current block and an average block thereof. On the other hand, when the directionality of intra-prediction is a vertical direction, the input data may be composed of one or more blocks selected from among the top neighboring blocks of the current block and the average block thereof.

The CNN setting unit 1910 may set the filter coefficients transmitted from the video encoding apparatus as filter coefficients for intra-prediction of the current block. Here, the filter coefficients may be values calculated by the video encoding apparatus on a basis of a predetermined unit, such as a CU or a frame.

When filter coefficients are set on the frame-by-frame basis, filter coefficients for a certain frame may be commonly used for intra-prediction of a plurality of coding blocks included in the certain frame. In this case, there may be a plurality of pieces of prediction directionality information, which is a type of hint information. For example, the directionality information about intra-prediction may be composed of one map, and the one map may contain a plurality of directionality values.

When the video encoding apparatus and the video decoding apparatus manage the same set of filter coefficients, the CNN setting unit 1910 may set filter coefficients for intra-prediction of the current block based on the index information about the filter coefficients transmitted from the video encoding apparatus.

While the CNN setting unit 1910 is illustrated in FIG. 19 as being included in the CNN predictor 1900, it should be noted that this is merely an example, and embodiments are not limited thereto. That is, the CNN setting unit 1910 may be implemented as a unit separate from the CNN predictor 1900. Alternatively, the CNN setting unit 1910 may be integrated with the CNN execution unit 1930 and implemented as a single unit.

The CNN execution unit 1930 may perform a CNN-based inference process on the input data using the filter coefficients set by the CNN setting unit 1910, that is, the coefficient values of the convolution kernel, to generate output data, that is, a prediction block for the current block.

Then, the generated prediction block may be transmitted to the adder and added to the residual block so as to be used in reconstructing the current block.

Hereinafter, an exemplary method of performing CNN-based intra-prediction according to this embodiment will be described with reference to FIGS. 20 and 21.

Figure 20:
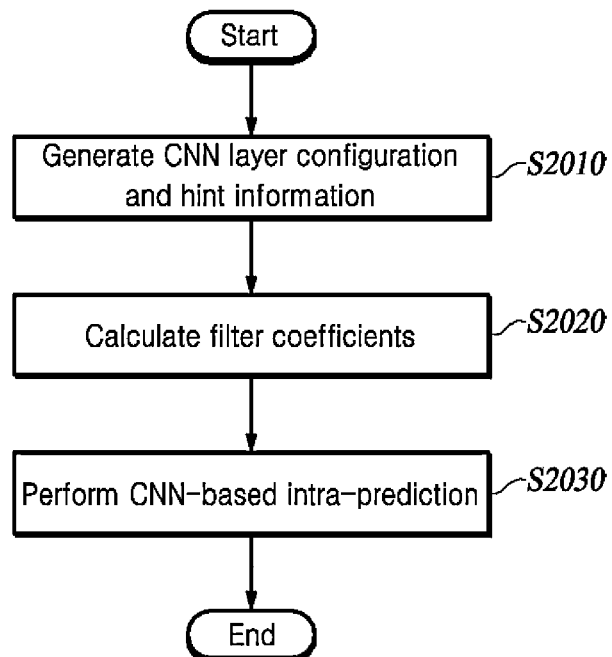
FIG. 20 is a flowchart illustrating an operation of a CNN predictor that may be included in the video encoding apparatus illustrated in FIG. 14.

FIG. 20 is a flowchart illustrating an operation of a CNN predictor that may be included in the video encoding apparatus illustrated in FIG. 14.

Referring to FIG. 20, in operation S2010, the CNN setting unit 1410 may set input data and an output label of the CNN.

The input data may be composed of a reference region encoded before the current block. For example, the input data may be composed of neighboring blocks of the same channel as the current block. Alternatively, the input data may be composed of neighboring blocks of the same channel as the current block, an average block thereof, and a current block of a channel different from that of the current block.

The data of the output layer may be a prediction block of the current block, and the label of the output layer may be the original block of the current block.

To improve the accuracy of intra-prediction, the CNN setting unit 1410 may set directionality information about prediction or the like as hint information. The set hint information may be transmitted to the video decoding apparatus through a bitstream and be used to decode a current block. In this case, input data may be configured in various combinations according to the directionality of intra-prediction.

In operation S2020, the CNN setting unit 1410 may calculate filter coefficients through a training process. The CNN setting unit 1410 may repeat the training process using an error backpropagation algorithm to improve the accuracy of intra-prediction.

The filter coefficient calculation operation may be performed on a basis of a predetermined unit, such as a frame or a block. The CNN setting unit 1410 may construct multiple sets of filter coefficients by pre-calculating filter coefficients using predetermined sample images. In this case, the CNN setting unit 1410 may set one set of filter coefficients selected from the multiple set according to a predetermined criterion as filter coefficients for the current block.

In operation S2030, The CNN execution unit 1430 may perform a CNN-based inference process on the input data using the filter coefficients set by the CNN setting unit 1410, that is, the coefficient values of the convolution kernel, to generate output data, that is, a prediction block for the current block. Then, the generated prediction block may be transmitted to the subtractor (e.g., 130 of FIG. 1) of the video encoding apparatus, and be used to generate a residual block from the current block.

Figure 21:
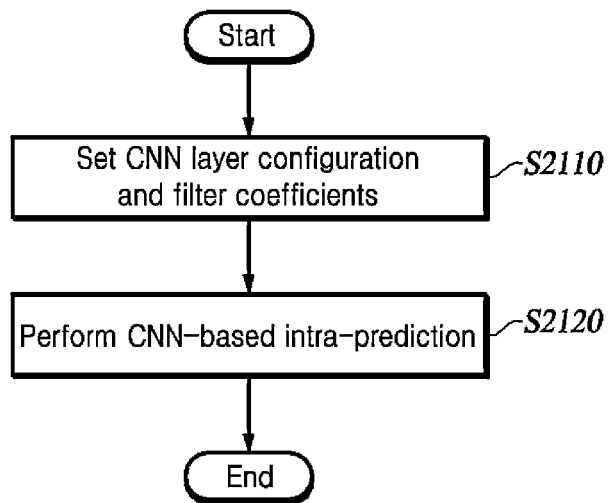
FIG. 21 is a flowchart illustrating an operation of a CNN predictor that may be included in the video decoding apparatus illustrated in FIG. 19.

FIG. 21 is a flowchart illustrating an operation of a CNN predictor that may be included in the video decoding apparatus illustrated in FIG. 19.

Referring to FIG. 21, in operation S2110, the CNN setting unit 1910 may set filter coefficients for intra-prediction of the current block based on the information about the filter coefficients transmitted from the video encoding apparatus.

The input data of the CNN may be composed of a reference region decoded before the current block, and the output data is a prediction block for the current block.

When hint information for intra-prediction is transmitted from the video encoding apparatus, the CNN setting unit 1910 may construct hint information extracted by the decoder (e.g., 410 of FIG. 4) as one map and concatenate the same to a layer of the CNN.

The input data may be configured in various combinations according to the directionality of intra-prediction.

In operation S2120, the CNN execution unit 1930 may perform a CNN-based inference process on the input data using the filter coefficients set by the CNN setting unit 1910, that is, the coefficient values of the convolution kernel, to generate output data, that is, a prediction block for the current block. Then, the generated prediction block may be transmitted to the adder (e.g., 450 in FIG. 4) and added to the residual block so as to be used in reconstructing the current block.

3. CNN-Based Inter-Prediction

Some techniques of the present disclosure relate to performing CNN-based inter-prediction. Hereinafter, a technique of performing CNN-based inter-prediction will be described with reference to FIGS. 22 to 28.

Figure 22:
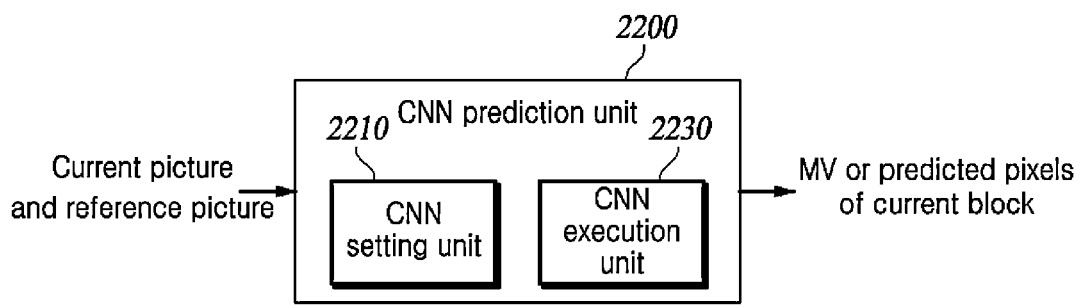
FIG. 22 is a block diagram illustrating the configuration of a CNN predictor that may be included in a video encoding apparatus according to an embodiment of the present disclosure.

FIG. 22 is a block diagram illustrating the configuration of a CNN predictor that may be included in a video encoding apparatus according to an embodiment of the present disclosure. The CNN predictor 2200 of FIG. 22 may be, for example, the inter-predictor 124 of the video encoding apparatus illustrated in FIG. 1 or a module included in the inter-predictor 124. Referring to FIG. 22, the CNN predictor 2200 may include a CNN setting unit 2210 and a CNN execution unit 2230.

First Embodiment

According to the first embodiment, the CNN predictor 2200 may set image data (i.e., input data) and filter coefficients (i.e., coefficients of a convolution kernel) to be input to the input layer of the CNN, and use the same to perform the inference process to predict a current block.

Hereinafter, each element and operation of the CNN predictor 2200 according to the first embodiment will be described in detail.

The CNN setting unit 2210 may set input data. Specifically, the CNN setting unit 2210 may select at least one reference picture and set a search region in the selected reference picture as input data. Here, the search region in the reference picture represents a specific region in the reference picture that has a size greater than or equal to the size of the current block.

The position of the search region in the reference picture may be determined based on the position of the current block. For example, it may be the same position as the current block in the reference picture, or a position shifted by a predefined motion vector from the same position. Here, as the predefined motion vector, a motion vector (MV) of a neighboring block adjacent to the current block, an initial motion vector shared by the video encoding apparatus and the video decoding apparatus, or a predicted MV may be used. Alternatively, a global MV in a unit of slice (or picture) to which the current block belongs may be used as the predefined MV.

The search region in the reference picture may have the same size as the current block, or may have a larger size than the current block. For example, the size of the search region may be a size of a region formed by extending a block having the same size as the current block at the position of the search region horizontally by the x coordinate of the above-described predefined MV and vertically by the y coordinate of the MV.

The CNN setting unit 2210 may select a reference picture based on the direction of inter-prediction. For example, in the case of unidirectional prediction, a reference picture of a specific sequence number in the reference picture list 0 may be selected. In the case of bidirectional prediction, a reference picture of a specific sequence number in reference picture list 0 and a reference picture of a specific sequence number in reference picture list 1 may be selected. Here, the information about the reference picture to be used as the input data of the CNN may include selection information (e.g., a reference picture index) for a reference picture of a specific sequence number in a specific reference picture list. Then, the information about the reference picture may be transmitted to the video decoding apparatus through the encoder (e.g., 190 in FIG. 1). In this case, the information about the reference picture may be encoded as a syntax of the coding unit (CU), such that different reference pictures for the respective CUs may be used as input data of the CNN. In addition, the information about the reference picture may be encoded as a syntax of a higher-level unit than the CU, for example, CTU, slice, PPS, or SPS, such that the same reference pictures are used as input data of the CNN for all CUs included in the higher-level unit.

The CNN setting unit 2210 may select a predefined reference picture such that the video encoding apparatus and the video decoding apparatus share a reference picture to be used as input data of the CNN. For example, in the case of unidirectional prediction, a first reference picture (e.g., a reference picture corresponding to reference picture index 0) and a second reference picture (e.g., a reference picture corresponding to reference picture index 1) may be selected in reference picture list 0. In the case of bidirectional prediction, the first reference picture (e.g., the reference picture corresponding to reference picture index 0) in reference picture list 0 and a first reference picture (e.g., a reference picture corresponding to reference picture index 0) in reference picture list 1 may be selected. However, it should be noted that this is merely an example, and embodiments are not limited thereto. That is, the CNN setting unit 2210 may set the input data of the CNN by selecting a reference picture in various ways.

Alternatively, the CNN setting unit 2210 may select at least one reference picture to be used as input data of the CNN from among a plurality of reference pictures, and transmit information about the selected reference picture to the video decoding apparatus through the encoder (e.g., 190 in FIG. 1). In this case, the information about the reference picture to be used as the input of the CNN may be encoded as a syntax of the CU, such that a different reference picture may be used as the input data of the CNN for each CU. Alternatively, the information about the reference picture to be used as the input of the CNN may be encoded as a syntax of a higher-level unit than the CU, for example, CTU, slice, PPS, or SPS, such that the same reference pictures are used as input data of the CNN for all CUs included in the higher-level unit. Here, the information about the reference picture to be used as the input of the CNN may be a picture order count (POC) value of the selected picture or a difference between the POC value of the selected picture and the POC value of the current picture.

The CNN setting unit 2210 may further set at least one of a reconstructed neighboring region adjacent to a current block in the current picture and an MV of the neighboring region as additional input data. Here, the neighboring region may be a region of the same component as the current block or a region of a different component. Further, the neighboring region may be configured in units of blocks (i.e., neighboring blocks) or may be configured in units of pixels (i.e., neighboring pixels or neighboring lines). The MVs of a plurality of neighboring regions may be set as input data individually, or one or more MVs may be integrated and used as input data.

In this embodiment, it is assumed that all input data is luma components. However, it should be noted that this is merely for simplicity and embodiments are not limited thereto. That is, the input data may be configured in various combinations of three components (i.e., Y, Cb, and Cr).

As input data, the MV may be represented using a color code. Here, the color code is a mapping of coordinate values of the MV to color values. The MV represented by the color code may be input to the CNN by constructing one or more maps. For example, colors are mapped to a two-dimensional plane of x and y coordinates, and a color value corresponding to the values of the MV (x, y) is used as a color code of the MV. In addition, the MV may be represented by one map composed of the x coordinate value of the MV and another map composed of the y coordinate value of the MV.

The maps for the MV may have the same resolution as a region corresponding to the MV. For example, the map for the MV of a reconstructed neighboring region adjacent to the current block may have the same resolution as the size of the neighboring region.

The map for an MV may mean that color codes representing the coordinate values of MVs are mapped to the respective pixels of the map. In addition, the map for the MV may mean that the same color code is mapped for each region of the map corresponding to the unit of the MV. For example, when the unit of an MV is a region obtained by splitting a neighboring region, that is, a sub-block, the same color code may be mapped to all pixels included in one sub-block of the map. In addition, for a map composed of x-coordinate values (or y-coordinate values) for the MV, the x-coordinate values (or y-coordinate values) of the MV may be mapped to each pixel (or all pixels included in the unit of MV) of the map.

When the resolution of the search region in the reference picture input to the input layer of the CNN is different from that of the reconstructed neighboring region in the current picture, the CNN setting unit 2210 may use a pooling layer or an upsampling layer to adjust the resolutions to be equal to each other.

The video data (i.e., output data) output through the output layer of the CNN according to the input data as described above may be an MV or predicted pixels of the current block.

Figure 23:
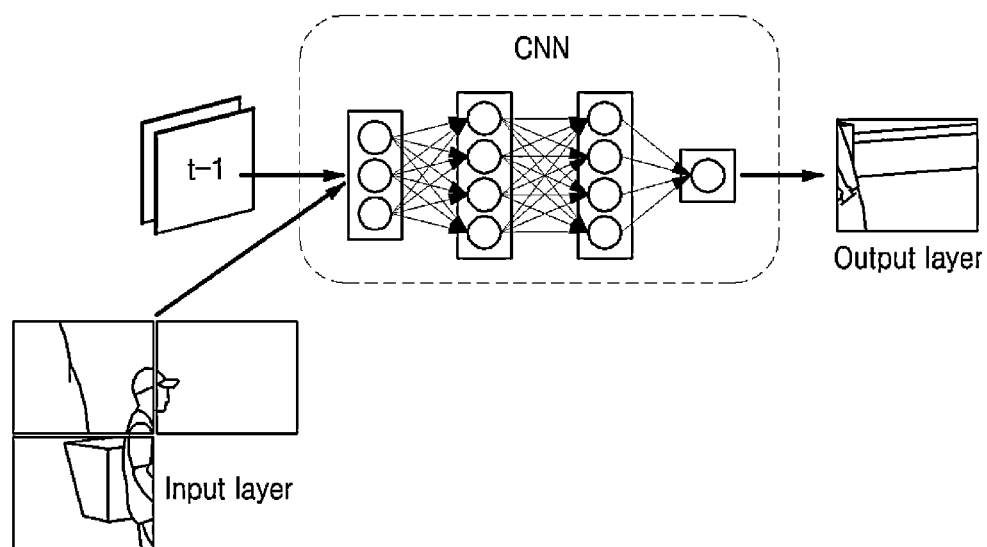
FIG. 23 is an exemplary diagram for layer configuration of a CNN.

FIG. 23 is an exemplary diagram for layer configuration of a CNN.

Referring to FIG. 23, input data is set as search regions in two reference pictures and three neighboring regions in a current picture. Here, the neighboring regions are selected as three reconstructed blocks positioned at the top, left, and top-left sides with respect to the current block, and each region is composed of a separate map and input to the input layer. In this case, the output data are predicted pixels of the current block.

Specific examples of CNN layer configuration may be summarized as shown in Table 2. However, it should be noted that this is merely an example and embodiments are not limited thereto.

TABLE 2

| CNN layer example# | Input layer Data | Output layer Data | Output layer Lable |
|---|---|---|---|
| Example 1 | Search regions in multiple reference pictures | Motion vector of current block or prediction pixels of current block | Actual motion vector of current block or original block of current block |
| Example 2 | Search regions in multiple reference pictures Motion vector of neighboring regions | Motion vector of current block or prediction pixels of current block | Actual motion vector of current block or original block of current block |
| Example 3 | Search regions in multiple reference pictures Neighboring regions (reconstructed pixels) | Motion vector of current block or prediction pixels of current block | Actual motion vector of current block or original block of current block |
| Example 4 | Search regions in multiple reference pictures Neighboring regions (reconstructed pixels) Motion vector of neighboring regions | Motion vector of current block or prediction pixels of current block | Actual motion vector of current block or original block of current block |

Referring to Table 2, the data of the input layer may be configured in various combinations. The data of the output layer are MVs or predicted pixels of the current block, and the label of the output layer is the actual MV of the current block or the original block of the current block. Here, the actual MV of the current block may mean, for example, an MV calculated through motion estimation (ME) using a full search technique or an MV obtained by refining the same. In this embodiment, the input data and the output data should be basically the same in the training process and inference process of the CNN.

The CNN setting unit 2210 may further set hint information as additional input data to improve the accuracy of inter-prediction. Here, the hint information may include information indicating a time-domain distance between the current picture and the reference picture, for example, a difference between a picture order count (POC) value of the current picture and a POC value of the reference picture. In this case, the number of pieces of the time-domain distance information present corresponds to the number of reference pictures. The hint information may include a QP. The QP used as hint information may be selected from among the QP values of the current block, a neighboring region, or a search region in the reference picture, or may be a value (e.g., an average value) derived from at least some of the values.

Figure 24:
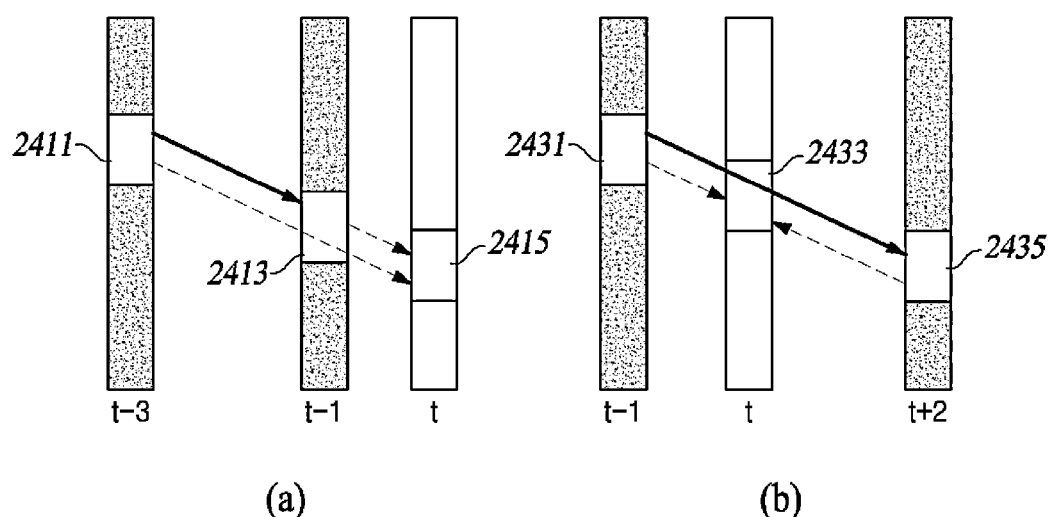
FIG. 24 is an exemplary diagram for time-domain distance information between a current picture and a reference picture.

FIG. 24 is an exemplary diagram for time-domain distance information between a current picture and a reference picture. Specifically, FIG. 24(*a*) illustrates unidirectional prediction, and FIG. 24(*b*) illustrates bidirectional prediction.

Referring to FIG. 24(*a*), in unidirectional prediction, time-domain distance information is −3 and −1 starting from the left. Based on the motion estimation result (indicated by a solid line) from a search region 2411 in picture t−3 to a search region 2413 in picture t−1, an MV from the search region 2411 in picture t−3 to a current block 2415 in picture t and an MV from the search region 2413 in picture t−1 to the current block 2415 in picture t may be inferred.

Referring to FIG. 24(*b*), in bidirectional prediction, time-domain distance information is −1 and +2 starting from the left. Based on the motion estimation result (indicated by a solid line) from a search region 2431 in picture t−1 to a search region 2435 in picture t+2, an MV from the search region 2431 in picture t−1 to a current block 2433 in picture t and an MV from a search region 2435 in picture t+2 to the current block 2433 in picture t may be inferred.

The hint information may be composed of one or more maps and be concatenated to a layer of the CNN. The map for the hint information may be concatenated at various positions between the input layer and the output layer. The hint information may be transmitted to the video decoding apparatus through a bitstream and be used in decoding the current block.

Figure 25:
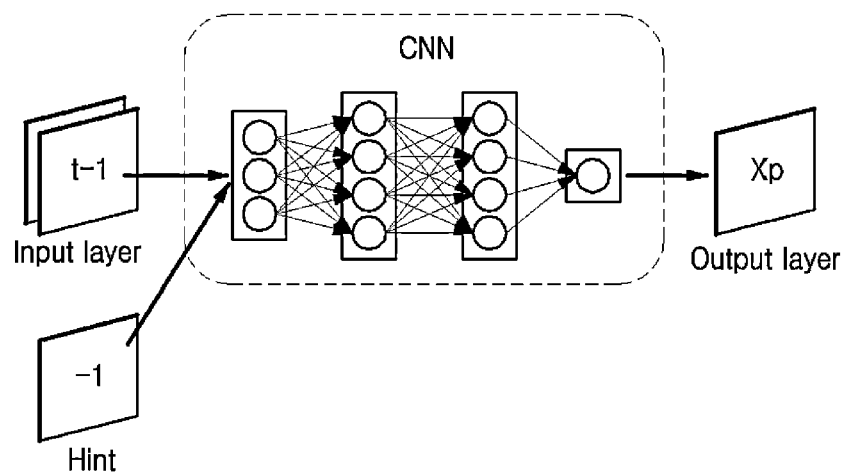
FIG. 25 is an exemplary diagram of a layer configuration of a CNN including hint information.

FIG. 25 is an exemplary diagram of a layer configuration of a CNN including hint information. Referring to FIG. 25, input data is set as hint information composed of a search region in two reference pictures and a map. In this case, the output data are predicted pixels of the current block.

The CNN setting unit 2210 may calculate filter coefficients through an iterative training process to minimize an error between the output data and the output label. To this end, the CNN setting unit 2210 may use an error backpropagation algorithm. Specifically, the CNN setting unit 2210 may propagate the error between the output data and the output label in the reverse direction from the output layer to the input layer via the hidden layer in the training process of the CNN. In the propagation operation of the error, the CNN setting unit 2210 may update connection weights between nodes to reduce the error. Then, the CNN setting unit 2210 may calculate the filter coefficients by repeating the training process using the error backpropagation algorithm until the error becomes less than a predetermined threshold.

The filter coefficients calculation operation described above may be performed on a basis of a predetermined unit (e.g., CU, CTU, slice, frame, or sequence (group of frames)). For example, the CNN setting unit 2210 may calculate filter coefficients for each current block or each frame.

When filter coefficients are calculated on the frame-by-frame basis, filter coefficients for a certain frame may be commonly used for inter-prediction of a plurality of coding blocks included in the certain frame.

The information about the calculated filter coefficients may be transmitted to the video decoding apparatus through a bitstream and used for the video decoding operation.

The CNN setting unit 2210 may construct multiple sets of filter coefficients by pre-calculating filter coefficients using predetermined sample images. In this case, the CNN setting unit 2210 may set one set of filter coefficients selected from the multiple sets according to a predetermined criterion as filter coefficients for the current block. For example, the CNN setting unit 2210 may select one set of filter coefficients from the set sets based on the similarity of pixel values between the current block and the sample images. Alternatively, the CNN setting unit 2210 may select, from the set sets, a set of filter coefficients closest to the filter coefficients calculated through one training process. Filter coefficient selection information, for example, index information, may be transmitted to the video decoding apparatus through a bitstream and used for the video decoding operation.

While the CNN setting unit 2210 is illustrated in FIG. 22 as being included in the CNN predictor 2200, it should be noted that this is merely an example, and embodiments are not limited thereto. That is, the CNN setting unit 2210 may be implemented as a unit separate from the CNN predictor 2200, or integrated with the CNN execution unit 2230 and implemented as a single unit.

The CNN execution unit 2230 may execute the CNN based on the input data and filter coefficients set by the CNN setting unit 2210 to generate an MV of the current block or directly generate predicted pixels of the current block. Then, the generated predicted pixels may be transmitted to the subtractor of the video encoding apparatus, and be used to generate a residual block from the current block.

Second Embodiment

According to the second embodiment, the CNN predictor 2200 may primarily generate an MV of the current block or predicted pixels according to an existing inter-prediction scheme (i.e., ME and MC), and then secondarily refine the MV or predicted pixels through a CNN-based inference process, thereby finally generating motion information of the current block or predicted pixels.

Hereinafter, each element and operation of the CNN predictor 2200 according to the second embodiment will be described in detail. However, description of details described in the first embodiment will be omitted or simplified.

The CNN predictor 2200 determines a reference picture encoded and decoded before the current picture, and searches for reference pixels most similar to the current block within the determined reference picture. Then, the CNN predictor 2200 may generate an MV or predicted pixels of the current block using the searched reference pixels. Then, the generated MV or predicted pixels of the current block are set as input data of the CNN by the CNN setting unit 2210.

The CNN setting unit 2210 may set filter coefficients to be applied to the CNN (i.e., coefficient values of the convolution kernel). The filter coefficients may be calculated by performing the training process of the CNN on the input data containing a search region in the reference picture. Here, the input data may further contain at least one of a neighboring region adjacent to the current block in the current picture and an MV of the neighboring region. The input data may further contain hint information for improving the accuracy of inter-prediction, for example, at least one of information indicating a time-domain distance between a current picture and a reference picture and a QP. In addition, the filter coefficients may be a preset specific values or values selected in a set consisting of a plurality of preset specific values.

The CNN execution unit 2230 may execute the CNN based on the input data and filter coefficients set by the CNN setting unit 2210 to refine the MV or predicted pixels of the current block, thereby finally generating the MV or predicted pixels of the current block. Then, the generated predicted pixels may be transmitted to the subtractor of the video encoding apparatus, and be used in generating a residual block from the current block.

Figure 26:
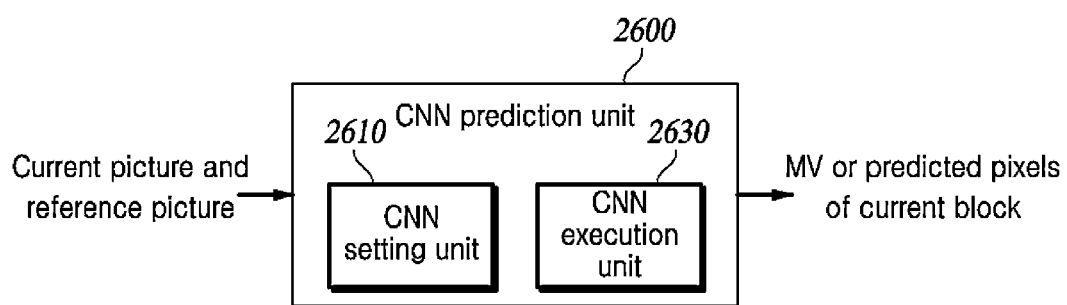
FIG. 26 is a block diagram illustrating the configuration of a CNN predictor that may be included in a video decoding apparatus according to an embodiment of the present disclosure.

FIG. 26 is a block diagram illustrating the configuration of a CNN predictor that may be included in a video decoding apparatus according to an embodiment of the present disclosure. The CNN predictor 2600 of FIG. 26 may be, for example, an inter-predictor 444 of the video decoding apparatus illustrated in FIG. 4 or a module included in the inter-predictor 444. Referring to FIG. 26, the CNN predictor 2600 may include a CNN setting unit 2610 and a CNN execution unit 2630.

First Embodiment

According to the first embodiment, the CNN predictor 2600 may determine a reference picture based on the reference picture selection information signaled from the video encoding apparatus, and perform the CNN inference process based on the determined reference picture to generate an MV or predicted pixels of the current block.

Hereinafter, each element and operation of the CNN predictor 2600 according to the first embodiment will be described in detail. However, description of content overlapping with the CNN predictor 2200 that may be included in the video encoding apparatus described above with reference to FIG. 22 will be omitted or simplified. The CNN setting unit 2610 may set input data. The CNN setting unit 2610 may select a reference picture based on the reference picture selection information signaled from the video encoding apparatus, and set a search region in the selected reference picture as input data. Here, the search region in the reference picture represents a specific region in the reference picture that has a size greater than or equal to the size of the current block, and the position and size of the search region are given as described above with reference to FIG. 22.

When a reference picture is selected based on the inter-prediction direction in the video encoding operation, the CNN setting unit 2610 may select the reference picture based on information about the inter-prediction direction signaled from the video encoding apparatus. For example, in the case of unidirectional prediction, a reference picture of a specific sequence number in the reference picture list 0 may be selected as input data in the same way as in the video encoding apparatus. In the case of bidirectional prediction, a reference picture of a specific sequence number in reference picture list 0 and a reference picture of a specific sequence number in reference picture list 1 may be selected in the same way as in the video encoding apparatus. Here, the selection information about the reference picture may be a value indicating the reference picture of a specific sequence number in the selected reference picture list, for example, a reference picture index value. The selection information about the reference picture may be a picture order count (POC) value of the selected picture, or a difference between the POC value of the selected picture and the POC value of the current picture.

The CNN setting unit 2610 may further set at least one of a reconstructed neighboring region adjacent to a current block in the current picture and an MV of the neighboring region as additional input data. Here, the MV may be composed of one or more maps represented by color codes. For example, the MV may be represented by a map composed of color values corresponding to the values of the vector (x, y). In addition, the MV may be represented by one map composed of the x coordinate value of the vector and another map composed of the y coordinate value of the vector.

The image data (i.e., output data) output through the output layer of the CNN according to the input data as described above may be an MV or predicted pixels of the current block.

Specific examples of the layer configuration of the CNN are described above with reference to Table 2. However, it should be noted that this is merely an example and embodiments are not limited thereto.

The CNN setting unit 2610 may further set hint information as additional input data to improve the accuracy of inter-prediction. Here, the hint information may include information indicating a time-domain distance between the current picture and the reference picture, for example, a difference between a picture order count (POC) value of the current picture and a POC value of the reference picture. In this case, the number of pieces of the time-domain distance information present corresponds to the number of reference pictures. The hint information may include a QP value of the current block, a neighboring region, or a search region in the reference picture.

The hint information may be concatenated to the input layer or convolutional layer of the CNN to form one concatenated layer. In this case, the hint information may be composed of one or more maps having the same resolution as the layer to which the information is to be concatenated. The hint information may be transmitted to the video decoding apparatus through a bitstream and used as input data for CNN-based inter-prediction.

The image data (i.e., output data) output through the output layer of the CNN according to the input data as described above may be an MV or predicted pixels of the current block.

The CNN setting unit 2610 may set the filter coefficients signaled from the video encoding apparatus as filter coefficients for inter-prediction of the current block.

In addition, when the filter coefficients are predefined to specific values and stored in the video encoding apparatus and the video decoding apparatus, respectively, the CNN setting unit 2610 may set the filter coefficients pre-stored in the video decoding apparatus as the filter coefficients for inter-prediction of the current block.

In addition, when multiple sets of the preset filter coefficients are prepared and then stored in the video encoding apparatus and the video decoding apparatus, the CNN setting unit 2610 may set filter coefficients selected from the multiple sets according to the selection information about the filter coefficients signaled from the video encoding apparatus, for example, index information, as filter coefficients for inter-prediction of the current block.

The CNN execution unit 2630 may execute the CNN using the input data and filter coefficients set by the CNN setting unit 2610 and infer motion information about the current block to generate predicted pixels. Then, the generated predicted pixels may be transmitted to the adder and added to the residual block, such that the predicted pixels may be used in reconstructing the current block.

Second Embodiment

According to the second embodiment, the CNN predictor 2600 may primarily generate an MV of the current block or predicted pixels according to an existing inter-prediction scheme (i.e., ME and MC), and then secondarily refine the MV or predicted pixels through a CNN-based inference process, thereby finally generating motion information of the current block or predicted pixels.

Hereinafter, each element and operation of the CNN predictor 2600 according to the second embodiment will be described in detail. However, description of details of the CNN predictor 2600 overlapping with those of the CNN predictor 2200 that may be included in the video encoding apparatus described above with reference to FIG. 22 will be omitted or simplified.

The CNN predictor 2600 may determine an MV of the current block and a reference picture referred to by the MV, based on the syntax element for the inter-prediction mode extracted from the decoder. Then, the CNN predictor 2600 may predict the current block using the determined MV and reference picture to generate motion information about the current block or predicted pixels thereof.

The CNN setting unit 2610 may set the generated motion information or predicted pixels of the current block as video data (i.e., input data) to be input to the input layer of the CNN.

Further, the CNN setting unit 2610 may set filter coefficients to be applied to the CNN (i.e., coefficient values of the convolution kernel). Here, the filter coefficients may be values transmitted from the video encoding apparatus. The filter coefficients may be preset specific values or values selected by the video encoding apparatus in a set consisting of a plurality of preset specific values.

While the CNN setting unit 2610 is illustrated in FIG. 26 as being included in the CNN predictor 2600, it should be noted that this is merely an example, and embodiments are not limited thereto. That is, the CNN setting unit 2610 may be implemented as a unit separate from the CNN predictor 2600, or integrated with the CNN execution unit 2630 and implemented as a single unit.

The CNN execution unit 2630 may execute the CNN based on the input data and filter coefficients set by the CNN setting unit 2610 to refine the MV or predicted pixels of the current block, thereby finally generating the MV or predicted pixels of the current block. Then, the generated predicted pixels may be transmitted to the ad der and added to the residual block so as to be used in reconstructing the current block.

Hereinafter, an exemplary method of performing CNN-based inter-prediction according to the present embodiment will be described with reference to FIGS. 27 and 28.

Figure 27A:
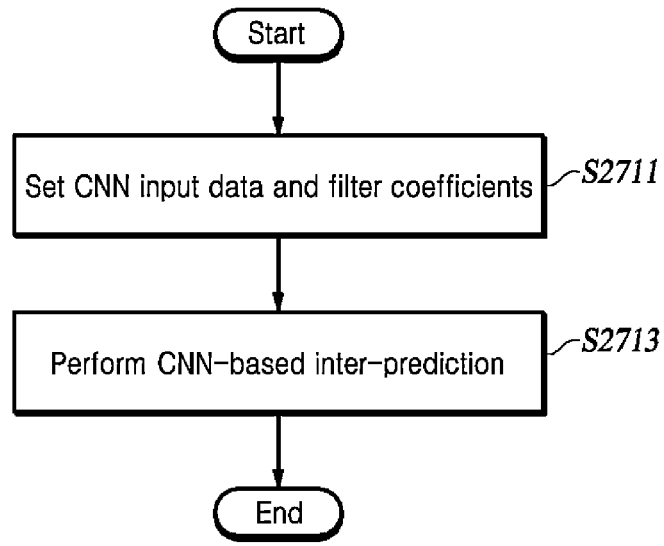
FIGS. 27A and 27B are flowcharts illustrating a process of performing inter-prediction by a CNN predictor that may be included in a video encoding apparatus according to an embodiment of the present disclosure.
Figure 27B:
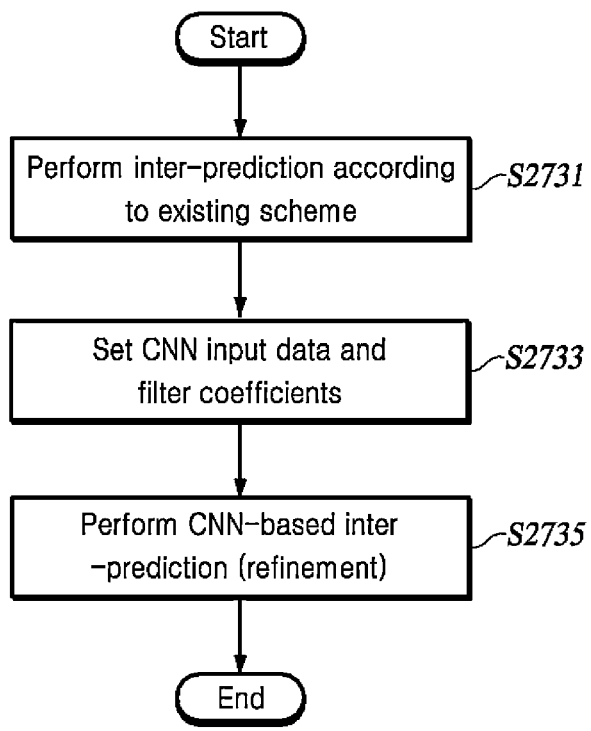

FIGS. 27A and 27B are flowcharts illustrating a process of performing inter-prediction by a CNN predictor that may be included in the video encoding apparatus illustrated in FIG. 22. Specifically, FIG. 27A illustrates a CNN-based inter-prediction process according to a first embodiment, and FIG. 27B illustrates a CNN-based inter-prediction process according to a second embodiment.

First Embodiment

Referring to FIG. 27A, in operation S2711, the CNN setting unit 2210 may set image data (i.e., input data) to be input to the input layer of the CNN in order to perform the CNN inference process. Here, the input data may contain a search region in a reference picture. The input data may further include at least one of a reconstructed neighboring region adjacent to a current block in a current picture and an MV of the neighboring region. In each case, the input data may further contain hint information, for example, information indicating a time-domain distance between the current picture and the reference picture, to improve the accuracy of inter-prediction.

The CNN setting unit 2210 may set filter coefficients to be applied to the CNN (i.e., coefficient values of the convolution kernel). Here, the filter coefficients may be values calculated by performing the training process of the CNN on the input data set in operation S2711. The filter coefficients may be preset specific values or values selected in a set consisting of a plurality of preset specific values.

In operation S2713, the CNN execution unit 2230 may execute the CNN based on the input data and filter coefficients set in operation S2711 to generate an MV of the current block or directly generate predicted pixels of the current block. Then, the generated predicted pixels may be transmitted to the subtractor, and be used to generate a residual block from the current block.

Second Embodiment

Referring to FIG. 27B, in operation S2731, the CNN predictor 2200 may generate an MV or predicted pixels of the current block according to an existing inter-prediction scheme (i.e., ME and MC).

Specifically, the CNN predictor 2200 determines a reference picture encoded and decoded before the current picture, and searches for reference pixels most similar to the current block within the determined reference picture. Then, the CNN predictor 2200 may generate an MV or predicted pixels of the current block using the searched reference pixels.

In operation S2733, the CNN setting unit 2210 may set the MV or predicted pixels of the current block generated in operation S1031 as image data (i.e., input data) to be input to the input layer of the CNN.

Further, the CNN setting unit 2210 may set filter coefficients to be applied to the CNN (i.e., coefficient values of the convolution kernel). The filter coefficients may be calculated by performing the training process of the CNN on the set input data. Here, the input data may contain a predetermined search region in the reference picture. The input data may further include at least one of a reconstructed neighboring region adjacent to a current block in a current picture and an MV of the neighboring region. In each case, the input data may further contain at least one of hint information for improving the accuracy of inter-prediction, for example, information indicating a time-domain distance between the current picture and the reference picture, and a QP. The filter coefficients may be preset specific values or values selected in a set consisting of a plurality of preset specific values.

In operation S2735, the CNN execution unit 2230 may execute the CNN based on the input data and filter coefficients set in operation S2733 to refine the MV or predicted pixels of the current block generated in operation S2731, thereby finally generating the MV or predicted pixels of the current block. Then, the generated predicted pixels may be transmitted to the subtractor of the video encoding apparatus, and be used in generating a residual block from the current block.

Figure 28A:
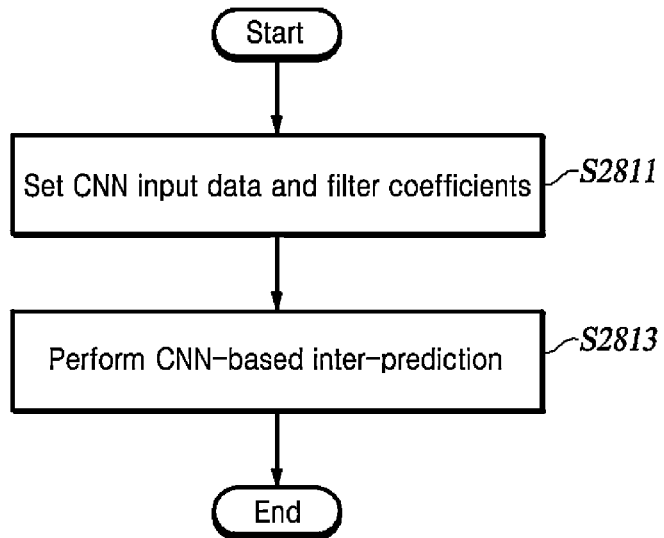
FIGS. 28A and 28B are flowcharts illustrating a process of performing inter-prediction by a CNN predictor that may be included in a video decoding apparatus according to an embodiment of the present disclosure.
Figure 28B:
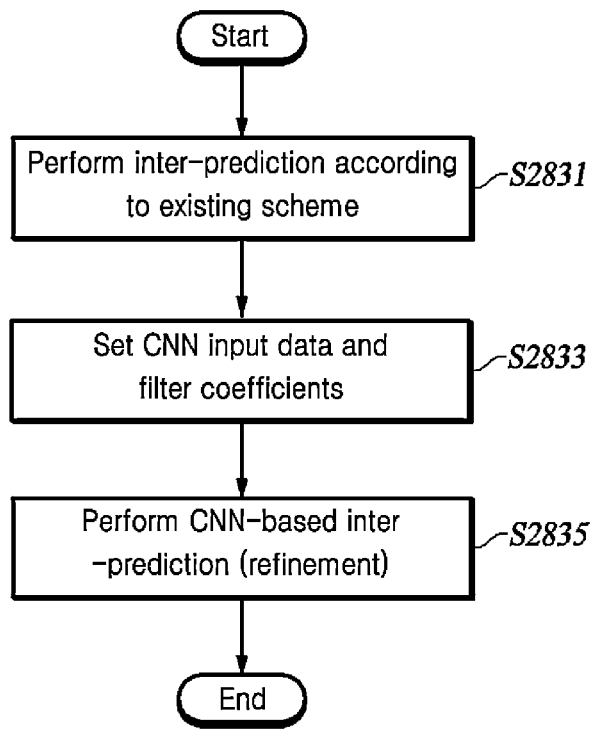

FIGS. 28A and 28B are flowcharts illustrating a process of performing inter-prediction by a CNN predictor that may be included in the video decoding apparatus illustrated in FIG. 26. Specifically, FIG. 28A illustrates a CNN-based inter-prediction process according to a first embodiment, and FIG. 28B illustrates a CNN-based inter-prediction process according to a second embodiment.

First Embodiment

Referring to FIG. 28A, in operation S2811, the CNN setting unit 2610 may set image data (i.e., input data) to be input to the input layer of the CNN in order to perform the CNN inference process. Here, the input data may contain a search region in the reference picture determined based on the reference picture selection information signaled from the video encoding apparatus. The input data may further include at least one of a reconstructed neighboring region of a current block in a current picture and an MV of the neighboring region. In each case, the input data may further contain hint information to improve the accuracy of inter-prediction.

The CNN setting unit 2610 may also set filter coefficients to be applied to the CNN (i.e., coefficient values of the convolution kernel). Here, the filter coefficients may be values signaled from the video encoding apparatus. The filter coefficients may be preset specific values or values selected by the video encoding apparatus in a set consisting of a plurality of preset specific values.

In operation S2813, the CNN execution unit 2630 may generate an MV or predicted pixels of the current block by executing the CNN based on the input data and filter coefficients set in operation S2811. Then, the generated predicted pixels may be transmitted to the adder of the video encoding apparatus and added to the residual block so as to be used in reconstructing the current block.

Second Embodiment

Referring to FIG. 28B, in operation S2831, the CNN predictor 2600 may generate an MV or predicted pixels of the current block according to an existing inter-prediction scheme (i.e., ME and MC).

Specifically, the CNN predictor 2600 may determine an MV of the current block and a reference picture referred to by the MV, based on the syntax element for the inter-prediction mode extracted from the decoder. Then, the CNN predictor 2600 may predict the current block using the determined MV and reference picture to generate an MV or predicted pixels of the current block.

In operation S2833, the CNN setting unit 2610 may set the motion vector or predicted pixels of the current block generated in operation S2831 as image data (i.e., input data) to be input to the input layer of the CNN.

Further, the CNN setting unit 2610 may set filter coefficients to be applied to the CNN (i.e., coefficient values of the convolution kernel). Here, the filter coefficients may be values signaled from the video encoding apparatus. The filter coefficients may be preset specific values or values selected by the video encoding apparatus in a set consisting of a plurality of preset specific values.

In operation S2835, the CNN execution unit 2630 may execute the CNN based on the filter coefficients set in operation S2833 to refine the MV or predicted pixels of the current block generated in operation S2831, thereby finally generating the MV or predicted pixels of the current block. Then, the generated predicted pixels may be transmitted to the adder of the video decoding apparatus and added to the residual block so as to be used in reconstructing the current block.

4. CNN-Based Intra-Prediction (2)—CNN-Based Reference Region Filtering

Some techniques of the present disclosure relate to a technique of performing CNN-based filtering on a reference region used for intra-prediction of a current block in order to minimize a quantization error of the reference region. That is, the prediction accuracy of the current block may be greatly improved without significantly changing the existing intra-prediction structure by filtering a neighboring region used for intra-prediction of the current block, rather than directly generating the prediction block of the current block based on the CNN.

First, a method of calculating filter coefficients of the CNN to be used in filtering the reference region will be described.

Figure 29:
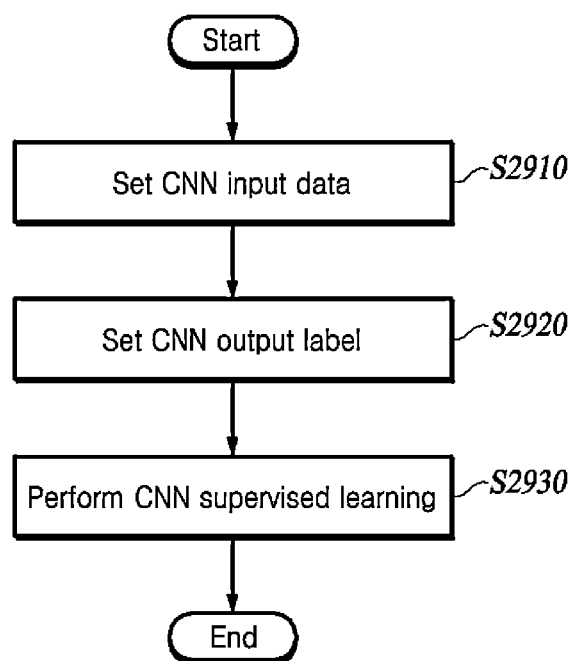
FIG. 29 is a flowchart illustrating a method of calculating filter coefficients of a CNN according to an embodiment of the present disclosure.

FIG. 29 is a flowchart illustrating a process of calculating filter coefficients of a CNN according to an embodiment of the present disclosure.

Referring to FIG. 29, in operation S2910, the video encoding apparatus may set input data of the CNN. The input data may include a reference region encoded before the current block, which is a block to be encoded.

The reference region may include at least one block among a neighboring region adjacent to the current block and a block of a component (hereinafter referred to as "a different component of the current block") encoded earlier than the block of a component to be encoded between the luma and chroma blocks constituting the current block. That is, the neighboring region may be a region of the same component as the current block or a region of a different component. The reference region may further include a new region (i.e., average blocks, average lines, or average pixels) generated by averaging pixel values of the neighboring region.

Figure 30:
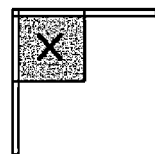
FIG. 30 is an exemplary diagram of a neighboring region usable as input data of a CNN according to an embodiment of the present disclosure.
Figure 30:
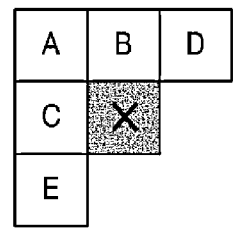

The neighboring region may be configured in units of pixels (i.e., neighboring lines or neighboring pixels), or may be configured in units of blocks (i.e., neighboring blocks). FIG. 30 is an exemplary diagram of a neighboring region that may be set as input data of a CNN. Specifically, FIG. 30(a) shows a neighboring region in units of pixels, and FIG. 30(b) shows a neighboring region in units of blocks.

Referring to FIG. 30(a), the neighboring region in units of pixels (i.e., neighboring pixels or neighboring lines) may include pixels of '1×1' and lines of '1×n' or 'n×1' adjacent to the current block X.

Referring to FIG. 30 (B), Referring to FIG. 30 (B), the neighboring region in units of blocks (i.e., neighboring blocks) may include a left block C, a top block B, a top-right block D, a bottom-left block E, and a top-left block A, which are adjacent to a current block X. In this specification, the original block (i.e., unencoded block), prediction block, and reconstructed block of a neighboring block are denoted differently. For example, for the top left block A, the original block is denoted by 'Ao', the prediction block is denoted by 'Ap', and the reconstructed block is denoted by 'Ar'. In addition, the average block obtained by averaging the pixel values of the neighboring blocks A, B, C, D, and E is denoted by 'F'. The neighboring region in units of blocks has a wider application range of the convolution kernel than the neighboring region in units of pixels, and may accordingly improve the accuracy of the output data when the neighboring region in units of pixels is set as the input data of the CNN.

When neighboring blocks of a component different from that of the current block are input to the CNN, not only the neighboring blocks Ar, Br, Cr, Dr, and Er shown in FIG. 30(b), but also one or more blocks (not shown) among the right block, the bottom block and the bottom-right block of the current block X may be input to the CNN. For example, when the current block is a chroma block, accuracy of intra-prediction may be further improved by adding, to the CNN, one or more blocks among the right block, the bottom block, and the bottom-right block of the current block of the luma component that has already been encoded. Hereinafter, for simplicity, the present embodiment will be described on the assumption that the reference region is composed of a neighboring region in units of blocks, that is, one or more neighboring blocks.

Figure 31:
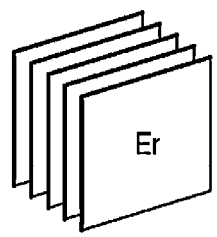
FIG. 31 is an exemplary diagram for a layer configuration of a CNN according to an embodiment of the present disclosure.
Figure 31:
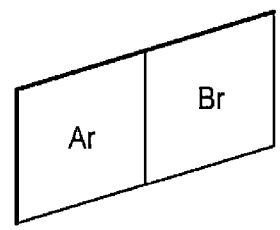

The input data may be composed of at least one layer and input to the CNN. For example, as shown in FIG. 31 (a), the neighboring blocks Ar, Br, Cr, Dr, and Er may be respectively configured as separate layers and input to the CNN. In addition, as shown in FIG. 31 (b), all or some neighboring blocks Ar and Br may be integrated into a single layer by a multiplier or the like and input to the CNN.

The input data may further contain additional information to improve the output accuracy of the CNN. The additional information may include all encoding related information that may be referred to by the video encoding/decoding apparatuses. For example, the additional information may include at least one of a QP value of the neighboring region, a QP value of the current block (for the video decoding apparatus), and information about a residual of the neighboring region. In the frequency domain, the information about the residual of the neighboring region may include the absolute value of each of the transform coefficients of the neighboring region or the sum of absolute values of all the transform coefficients. Further, in the spatial domain, the information about the residual of the neighboring region may include the absolute value of each of the residual signals of the neighboring region or the absolute sum of all the residual signals.

When the input data contains a reference region in units of lines and k pieces of additional information, a convolution kernel of 'n×1×k' or '1×n×k' may be applied to the input layer of the CNN. Alternatively, when the input data contains a reference region in units of blocks and k pieces of additional information, a convolution kernel of 'n×m×k' may be applied to the input layer of the CNN.

In the YCbCr 4:2:0 or 4:2:2 format, the chroma block may be used in the original size thereof, or may be used after being up-scaled using an upsampling layer so as to have the same size as the luma block.

In operation S2920, the video encoding apparatus may set an output label to be used for supervised learning of the CNN.

The output label represents an explicit answer to the input data set in operation S2910, and is used to calculate a squared error through comparison with the output data of the CNN. The output label may be original pixel values of a neighboring region set as input data, or pixel values to which a QP whose value is less than the QP value applied to the neighboring region among the pixel values of a different component of the neighboring region.

The output data refers to data output through the output layer as a result of execution of the CNN, and may be pixel values (hereinafter referred to as a "reconstructed neighboring region") reconstructing the pixel values of the neighboring region set as input data to the level before quantization. The input data and output data of the CNN should be basically the same in the training process and the inference process.

Table 3 shows specific examples of CNN layer configuration.

TABLE 3

| CNN layer example# | Input layer Data | Output layer Data | Lable |
|---|---|---|---|
| Example 1 | Neighboring region in line unit Additional information | Reconstructed neighboring region, or Residual information about reconstructed neighboring region | Original pixel values of neighboring region, or Pixel values of a component previously decoded using a QP smaller than the current QP among the components of the neighboring region |
| Example 2 | Neighboring region in block unit Additional information | Reconstructed neighboring region, or Residual information about reconstructed neighboring region | Original pixel values of neighboring region, or Pixel values of a component previously decoded using a QP smaller than the current QP among the components of the neighboring region |
| Example 3 | Neighboring region in line unit or block unit Additional information | Reconstructed neighboring region, or Residual information about reconstructed neighboring region | Original pixel values of neighboring region, or Pixel values of a component previously decoded using a QP smaller than the current QP among the components of the neighboring region |

Referring to Table 3, the data of the input layer (input data) may be composed of a neighboring region in units of lines and/or blocks and additional information. In this case, the data of the output layer (output data) may be a neighboring region reconstructed by approximating original pixel values given for the neighboring region set as input data before quantization, or residual information (pixel values) for the neighboring region. In addition, the label of the output layer may be the original pixel values of the neighboring region set as the input data, or pixel values of a component decoded using QP whose value is less than that of the region of a component set as the input data among the luma block and chroma blocks constituting the neighboring region. The input data and output data as described above should be basically the same in the training process and inference process of the CNN. However, it should be noted that this is merely an example and embodiments are not limited thereto.

In operation S2930, the video encoding apparatus calculates filter coefficients of the CNN by repeatedly performing the supervised learning operation of the CNN using an error backpropagation algorithm based on the input data set in operation S2910 and the output label set in operation S2920. The video encoding apparatus may calculate the filter coefficients for each of Y, Cb, and Cr components, or may calculate filter coefficients to be commonly applied to the Y, Cb, and Cr components.

Hereinafter, a configuration and method for filtering a reference region used for intra-prediction based on a CNN will be described in detail with reference to the accompanying drawings.

Figure 32:
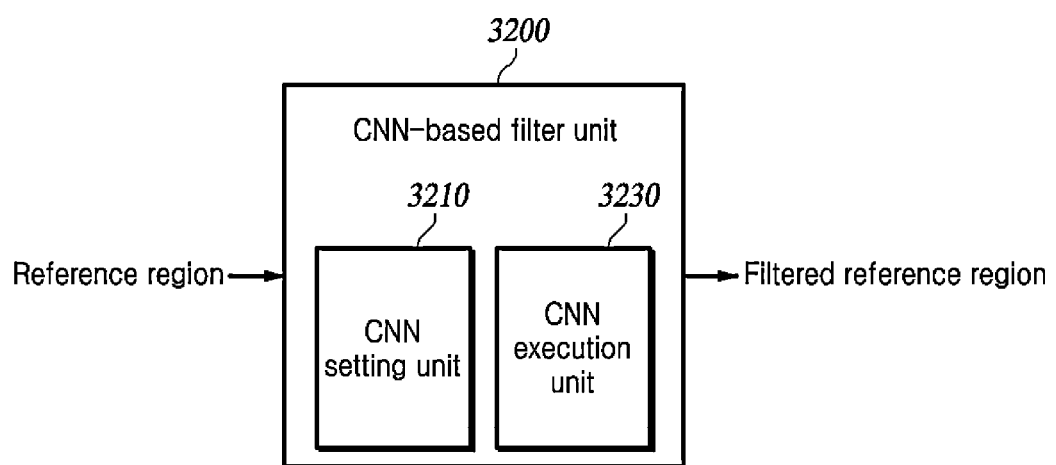
FIG. 32 is a block diagram illustrating the configuration of a CNN-based filter unit according to an embodiment of the present disclosure.

FIG. 32 is a block diagram illustrating the configuration of a CNN-based filter unit according to an embodiment of the present disclosure. Referring to FIG. 32, a CNN-based filter unit 3200 may include a CNN setting unit 3210 and a CNN execution unit 3230.

The structure of the CNN is configured as described above with reference to FIG. 5. The CNN may further include an upsampling layer or a pooling layer to adjust the size of layers.

The CNN setting unit 3210 may set input data of the CNN. As described above with reference to FIG. 29, the input data may be composed of a reference region reconstructed before a current block. The reference region may include at least one block among a neighboring region adjacent to the current block and a block of a component (hereinafter referred to as "a different component of the current block") encoded earlier than the block of a component to be encoded between the luma and chroma blocks constituting the current block. That is, the neighboring region may be a region of the same component as the current block or a region of a different component. The reference region may further include a new region (i.e., an average block, an average line, or an average pixel) generated by averaging pixel values of the neighboring region.

The neighboring region may be configured in units of pixels (i.e., neighboring lines or neighboring pixels), or may be configured in units of blocks (i.e., neighboring blocks). The neighboring region in units of blocks has a wider application range of the convolution kernel than the neighboring region in units of pixels, and may accordingly improve the accuracy of the output data when it is set as the input data of the CNN.

The input data may be composed of at least one layer and input to the CNN. For example, the input data may be composed of one layer for each neighboring block and input to the CNN. In addition, the input data may be composed of one layer in which all or some neighboring blocks Ar and Br are integrated and be input to the CNN.

The input data may further contain additional information to improve the accuracy of the CNN training process and the CNN inference process. The additional information may include at least one of a QP value of a reference region, a QP value of a current block (for the video decoding apparatus), and information about a residual of the reference region. Here, the information about the residual of the reference region may be the respective absolute values or absolute sum of the transform coefficients of the reference region in the frequency domain, and may be the respective absolute values or absolute sum of the residual signals in the spatial domain. The additional information may further include intra-prediction mode information (e.g., directionality information about intra-prediction) for the current block.

When the input data contains a neighboring region in units of lines and k pieces of additional information, a convolution kernel of 'n×1×k' or '1×n×k' may be applied to the input layer of the CNN. Alternatively, when the input data contains a neighboring region in units of blocks and k pieces of additional information, a convolution kernel of 'n×m×k' may be applied to the input layer of the CNN.

The CNN setting unit 3210 may set the filter coefficients calculated by the video encoding apparatus as filter coefficients for intra-prediction of the current block. Here, the filter coefficients may be values calculated by the video encoding apparatus on a basis of a predetermined unit, for example, CU or frame.

When filter coefficients are set on the frame-by-frame basis, filter coefficients for a certain frame may be commonly used for intra-prediction of a plurality of current blocks included in the certain frame.

When the video encoding apparatus and the video decoding apparatus manage multiple sets of filter coefficients, the CNN setting unit 3210 may set filter coefficients for intra-prediction of the current block from the multiple sets of filter coefficients based on the index information about the filter coefficients transmitted from the video encoding apparatus.

While the CNN setting unit 3210 is illustrated in FIG. 32 as being included in the CNN-based filter unit 3200, it should be noted that this is merely an example, and embodiments are not limited thereto. That is, the CNN setting unit 3210 may be implemented as a unit separate from the CNN-based filter unit 3200. The CNN setting unit 3210 may be integrated with the CNN execution unit 3230 and implemented as a single unit.

The CNN execution unit 3230 may perform a CNN-based inference process on the input data using the filter coefficients set by the CNN setting unit 3210, that is, the coefficient values of the convolution kernel, to generate output data, that is, a prediction block for the current block.

Then, the generated prediction block may be transmitted to the subtractor on the video encoding apparatus side and used to generate a residual block of the current block, or may be transmitted to the adder on the video decoding apparatus side and added to the residual block of the current block so as to be used in reconstructing the current block.

Figure 33:
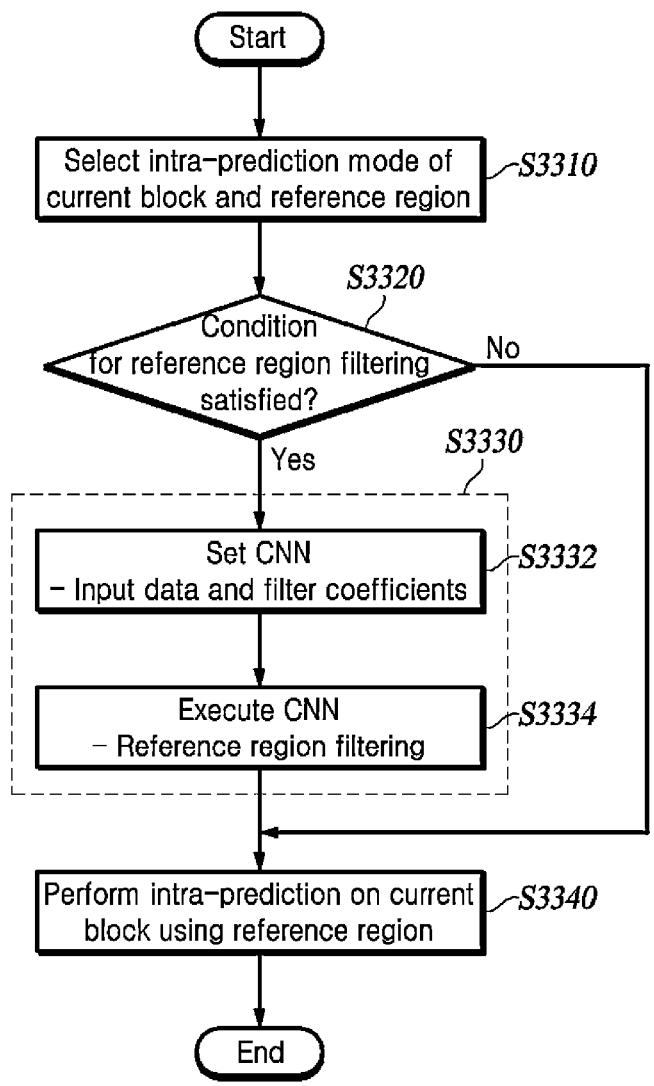
FIG. 33 is a flowchart illustrating a filtering process of a reference region according to an embodiment of the present disclosure.

FIG. 33 is a flowchart illustrating a filtering process of a reference region according to an embodiment of the present disclosure.

Referring to FIG. 33, in operation S3310, the intra-predictor may determine an intra-prediction mode to be used for encoding or decoding of the current block. The intra-prediction mode may include a plurality of modes according to the prediction direction, as described above with reference to FIG. 3. For example, the intra-prediction mode may include non-directional modes, which may include a planar mode and a DC mode, and 65 directional modes.

The intra-predictor may select a reference region to be used for intra-prediction of the current block according to the determined intra-prediction mode. That is, the reference region may be configured differently according to the intra-prediction mode of the current block. As described above with reference to FIG. 29, the reference region may include a pre-reconstructed neighboring region adjacent to the current block. The reference region may further include additional information related to intra-prediction of the current block.

In operation S3320, the intra-predictor may determine whether to perform filtering on the reference region selected in operation S3310 by determining whether a preset filtering condition is satisfied.

While the reference region selected for intra-prediction of the current block is processed through the quantization/inverse quantization process, a quantization error may be produced with respect to the original pixel values. The quantization error causes degradation of the accuracy of intra-prediction. Accordingly, in order to minimize quantization error, the reference region needs to be filtered before intra-prediction is performed on the current block. However, filtering the reference region does not guarantee minimization of the quantization error, and may increase the complexity of the video encoding/decoding operation. Accordingly, the intra-predictor according to the present embodiment may adaptively perform filtering on a reference region to be used for intra-prediction of the current block only under a specific condition.

The filtering condition may be set based on the size of each reference region selected for intra-prediction of a current block. For example, the intra-predictor may perform filtering on a neighboring block included in the reference region only when the size of the neighboring block is '4×4' or larger. Further, the filtering condition may be set based on the intra-prediction mode of the current block and the size of the current block. For example, when the intra-prediction mode is the DC mode, filtering of the reference region is not performed regardless of the size of the current block. When the intra-prediction mode is a directional mode having a prediction direction of "Vertical-Right," filtering may be performed on the reference region only when the size of the current block is '8×8' or larger. However, it should be noted that this is merely an example and embodiments are not limited thereto.

As described above, by adaptively filtering the reference region selected for intra-prediction of the current block, the intra-predictor may improve the accuracy of intra-prediction and minimize the increase in complexity of the video decoding operation.

When it is determined in operation S3320 that the preset filtering condition is satisfied ("Yes"), the intra-predictor may determine to perform filtering on the reference region selected for intra-prediction of the current block, and proceed to operation S3330.

When it is determined in operation S3320 that the preset filtering condition is not satisfied ("No"), the intra-predictor may determine not to perform filtering on the reference region selected for intra-prediction of the current block, and proceed to operation S3340.

In operation S3330, the intra-predictor may perform filtering on the reference region selected in operation S3310 and generate pixel values (hereinafter referred to as a "filtered reference region") recovering the level of pixel values of the reference region given before quantization. Here, a CNN-based filter may be used to filter the reference region. Hereinafter, a process of filtering the reference region using the CNN-based filter will be described in detail.

In operation S3332, the intra-predictor may set input data and filter coefficients of the CNN in order to perform CNN-based filtering on the reference region.

Specifically, the input data of the CNN is a reference region to be used for intra-prediction of the current block, and is set as the reference region selected in operation S3310.

The filter coefficients of the CNN are set to the filter coefficients which have been calculated through the supervised learning operation of the video encoding apparatus. The filter coefficients calculated by the video encoding apparatus may be signaled to the video decoding apparatus through a bitstream, and be used in the CNN-based filtering process of the video decoding apparatus. In addition, when the filter coefficients are preset to specific values and stored in the video encoding apparatus and the video decoding apparatus, respectively, the filter coefficients stored in each apparatus may be used in the CNN-based filtering process without additional signaling. When multiple sets of the preset filter coefficients are prepared, and then stored in the video encoding apparatus and the video decoding apparatus, respectively, a specific set of filter coefficients in the multiple set may be used in the CNN-based filtering process of the video decoding apparatus based on selection information about filter coefficients selected by the video encoding apparatus (e.g., index information about the filter coefficients in the multiple set). In this case, the filter coefficients may be preset to a plurality of specific values according to the QP value to configure one set, and a specific example thereof is shown in Table 4. However, it should be noted that the contents of Table 4 are exemplary, and embodiments are not limited thereto.

TABLE 4

| Group (index) | QP | Filter coefficients |
| --- | --- | --- |
| Group 1 (G01) | 0-10 | W00, W01, W02, W03 |
| Group 2 (G02) | 11-20 | W04, W05, W06, W07 |
| Group 3 (G03) | 21-30 | W08, W09, W10, W11 |
| Group 4 (G04) | 31-40 | W12, W13, W14, W15 |
| Group 5 (G05) | 41- | W16, W17, W18, W19 |

Referring to Table 4, when the QP of the reference region selected for intra-prediction of the current block has a value ranging from 0 to 10, the filter coefficients "W00 to W03" set to group 1 (G01) may be used in the CNN-based filtering process for the reference region. Similarly, when the QP of the reference region selected for intra-prediction of the current block has a value greater than or equal to '41', the filter coefficients 'W16 to W19' set to group 5 (G05) may be used in the CNN-based filtering process for the reference region. In each case, the group index information ('G01 to G05') corresponding to the filter coefficients selected by the video encoding apparatus may be signaled to the video decoding apparatus through a bitstream, and be used in the CNN-based filtering process of the video decoding apparatus.

In operation S3334, the intra-predictor may execute the CNN to which the filter coefficients set in operation S3332 are applied and perform the inference process on the input data, thereby generating output data. Here, the generated output data may be a filtered reference region in which pixel values of a reference region set as input data are reconstructed to a level before quantization.

In operation S3340, the intra-predictor may perform intra-prediction on the current block based on the reference region.

Here, the reference region used for the intra-prediction may be an unfiltered reference region selected in operation S3310. Alternatively, the reference region used for the intra-prediction may be a reference region filtered to a level before quantization in operation S3330.

When intra-prediction is performed on the current block using the filtered reference region, the intra-predictor may perform intra-prediction on the current block using the pixel values of the filtered reference region. In this case, the intra-predictor may perform intra-prediction on the current block using pixel values (i.e., a weighted average value) calculated by applying a preset weight to the pixel values of the filtered reference region and pixel values of the reference region given before being filtered. Here, the weight may be a value determined experimentally to improve the accuracy of the intra-prediction result and the video encoding/decoding efficiency.

Figure 34:
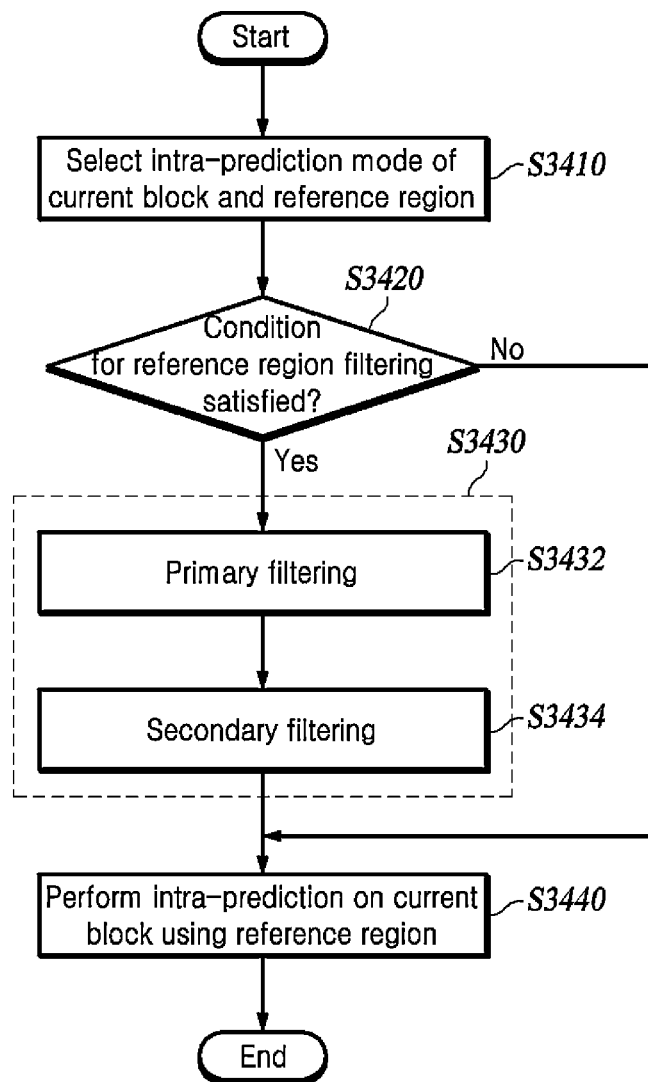
FIG. 34 is a flowchart illustrating a filtering process of a reference region according to an embodiment of the present disclosure.

FIG. 34 is a flowchart illustrating a filtering process of a reference region according to another embodiment of the present disclosure. The filtering process of FIG. 34 differs from the filtering process of FIG. 33 in terms of a specific method of filtering the reference region. Description of parts described above will be omitted or simplified below.

Referring to FIG. 34, in operation S3410, the intra-predictor may determine an intra-prediction mode to be used for encoding or decoding of the current block. The intra-predictor may select a reference region to be used for intra-prediction of the current block according to the determined intra-prediction mode. The reference region may include a pre-reconstructed neighboring region adjacent to the current block. The reference region may further include additional information related to intra-prediction of the current block.

In operation S3420, the intra-predictor may determine whether to perform filtering on the reference region selected in operation S3410 by determining whether a preset filtering condition is satisfied.

While the reference region selected for intra-prediction of the current block is processed through the quantization/inverse quantization process, a quantization error may be produced with respect to the original pixel values. Accordingly, in order to minimize the quantization error and not to significantly increase the complexity of the video encoding/decoding operation, the intra-predictor may adaptively filter the reference region under a specific condition.

The filtering condition may be set based on the size of each reference region selected for intra-prediction of a current block. For example, the intra-predictor may perform filtering on a neighboring block included in the reference region only when the size of the neighboring block is '4×4' or larger. Further, the filtering condition may be set based on the intra-prediction mode of the current block and the size of the current block. For example, when the intra-prediction mode is the DC mode, filtering of the reference region is not performed regardless of the size of the current block. When the intra-prediction mode is a directional mode having a prediction direction of "Vertical-Right," filtering may be performed on the reference region only when the size of the current block is '8×8' or larger. However, it should be noted that this is merely an example and embodiments are not limited thereto.

When it is determined in operation S3420 that the preset filtering condition is satisfied ("Yes"), the intra-predictor may determine to perform filtering on the reference region selected for intra-prediction of the current block, and proceed to operation S3430.

When it is determined in operation S3420 that the preset filtering condition is not satisfied ("No"), the intra-predictor may determine not to perform filtering on the reference region selected for intra-prediction of the current block, and proceed to operation S3440.

In operation S3430, the intra-predictor may perform filtering on the reference region selected in operation S3410 and generate pixel values (hereinafter referred to as a "filtered reference region") recovering the level of pixel values of the reference region given before quantization.

Here, a low-pass filter (e.g., a 2-tap filter, a 3-tap filter, etc.) and a CNN-based filter may all be used to filter the reference region.

In this case, the filtering of the reference region may be initially performed using the low-pass filter (or the CNN-based filter), and then secondarily performed using the CNN-based filter (or the low-pass filter). Hereinafter, a process of filtering the reference region using the low-pass filter and the CNN-based filter will be described in detail.

In operation S3432, the intra-predictor may primarily filter the reference region using the low-pass filter. The method of filtering the reference region using the low-pass filter is apparent to those skilled in the art, and thus a separate description thereof will be omitted.

In operation S3434, the intra-predictor may secondarily filter the reference region filtered in operation S3432, using the CNN-based filter.

Specifically, the input data of the CNN is set to the reference region filtered in operation S3432 as a reference region to be used for intra-prediction of the current block.

The filter coefficients of the CNN are set to the filter coefficients calculated through the supervised learning operation of the video encoding apparatus. The filter coefficients calculated by the video encoding apparatus may be signaled to the video decoding apparatus through a bitstream, and be used in the CNN-based filtering process of the video decoding apparatus. In addition, when the filter coefficients are preset to specific values and stored in the video encoding apparatus and the video decoding apparatus, respectively, the filter coefficients stored in each apparatus may be used in the CNN-based filtering process without additional signaling. When multiple sets of the preset filter coefficients are prepared, and then stored in the video encoding apparatus and the video decoding apparatus, respectively, a specific set of filter coefficients in the multiple sets may be used in the CNN-based filtering process of the video decoding apparatus based on selection information about filter coefficients selected by the video encoding apparatus (e.g., index information about the filter coefficients in the multiple sets). In this case, the filter coefficients may be preset to a plurality of specific values according to the range of the QP value to configure one set, and a specific example thereof is shown in Table 4 as described above.

The intra-predictor may execute a CNN to which specific filter coefficients are applied and perform the inference process on the input data, thereby generating output data. Here, the generated output data may be a filtered reference region in which pixel values of a reference region set as input data are reconstructed to a level before quantization.

In operation S3440, the intra-predictor may perform intra-prediction on the current block based on the reference region.

Here, the reference region used for the intra-prediction may be an unfiltered reference region selected in operation S3410. Alternatively, the reference region used for the intra-prediction may be a reference region filtered to a level before quantization in operation S3430.

When intra-prediction is performed on the current block using the filtered reference region, the intra-predictor may perform intra-prediction on the current block using the pixel values of the filtered reference region. In this case, the intra-predictor may perform intra-prediction on the current block using pixel values (i.e., a weighted average value) calculated by applying a preset weight to the pixel values of the filtered reference region and pixel values of the reference region given before being filtered. Here, the weight may be a value determined experimentally to improve the accuracy of the intra-prediction result and the video encoding/decoding efficiency.

In the various flowcharts and related descriptions illustrating the techniques of the present disclosure, a plurality of operations are described as being performed sequentially, but this is merely illustrative of the technical spirit of the embodiments of the present disclosure. In other words, those skilled in the art to which the present disclosure pertains will appreciate that various modifications and changes can be made to the present disclosure without departing from the essential features of the embodiments of the present disclosure in a manner that the operations are performed in a different sequential order or some of the operations are performed in parallel. Therefore, the flowcharts shown in the drawings are not necessarily limited to a time series order.

The functions or operations of the apparatuses and operation of the methods described above may each be embodied as a computer program, and may be recorded on a non-transitory computer-readable medium. The computer-readable recording medium includes any type of recording devices on which data that may be read by a computer system are recordable. Examples of the computer-readable recording medium include a magnetic storage medium (e.g., a ROM, a floppy disk, a hard disk, etc.), and an optically readable medium (e.g., CD-ROM, DVD, etc.). Further, an example computer-readable recording medium has computer-readable codes that may be stored and executed in a distributed manner in computer systems connected over a network.

The above description is merely illustrative of the technical idea of the present disclosure, and those skilled in the art will appreciate that various modifications and changes are possible, without departing from the spirit and scope of the present disclosure. Therefore, the present embodiments are not intended to limit the technical spirit of the present disclosure, but to explain the same, and the scope of the technical spirit of the present disclosure is not limited by these embodiments. Accordingly, one of ordinary skill would understand that the scope of the embodiments is not limited by the explicitly described above embodiments but is inclusive of the claims and equivalents thereto.

What is claimed is:

1. An intra-prediction based video decoding apparatus, the apparatus comprising at least one processor configured to:
    decode, from a bitstream, transform coefficients corresponding to a current block to be decoded in a current picture;
    configure an input data using at least one reference area that is included in the current picture and has been decoded prior to the current block, wherein the input data is configured using average pixel values which are generated by performing an averaging operation on values of pixels in the reference area;
    filter the input data using a filter coefficient set which is in a two or three dimensional matrix form to thereby set the filtered input data as predicted pixels for the current block;
    generate residual signals for the current block by inversely transforming the transform coefficients; and
    reconstruct the current block by adding the predicted pixels and the residual signals corresponding thereto,
    wherein the at least one processor is further configured to decode, from the bitstream, first information for selecting the filter coefficient set to apply to the current block among a plurality of filter coefficient sets each of which is in the two or three dimensional matrix form, and wherein the filter coefficient set is determined based on the first information.

2. The apparatus of claim 1, wherein the filter coefficient set corresponds to kernel coefficients of a Convolutional Neural Network.

3. The apparatus of claim 2, wherein the input data includes hint information for intra-predicting the current block, and
wherein the hint information includes one or more of:
prediction directionality information related to an intra prediction,
a quantization parameter of the current block or the reference area, or
an absolute sum of transform coefficients or residual signals corresponding to a neighboring area of the current block.

4. The apparatus of claim 1, the at least one processor is further configured to:
decode, from the bitstream, second information related to the configuration of the input data,
wherein the input data is configured by combining, based on the second information, pixels obtained from a left reference area and an above reference area which are adjacent to the current block.

5. An intra-prediction based video encoding apparatus, the apparatus comprising at least one processor configured to:
configure an input data using at least one reference area that has been encoded and then decoded prior to a current block to be encoded in a current picture, wherein the reference area is included in the current picture, and the input data is configured using average pixel values which are generated by performing an averaging operation on values of pixels in the reference area;
filter the input data using a filter coefficient set which is in a two or three dimensional matrix form to thereby set the filtered input data as predicted pixels for the current block;
generate residual signals by subtracting the predicted pixels from pixels of the current block; and
encode the residual signals into a bitstream,
wherein the filter coefficient set to be applied to the current block is selected from among a plurality of filter coefficient sets each of which is in a two or three dimensional matrix form, and
wherein the at least one processor is further configured to encode first information, into the bitstream, for use in selecting the filter coefficient set to be applied to the current block from among the plurality of filter coefficient sets.

6. The apparatus of claim 5, wherein the filter coefficient set corresponds to kernel coefficients of a Convolutional Neural Network.

7. The apparatus of claim 6, wherein the input data includes hint information for intra-predicting the current block, and
wherein the hint information includes one or more of:
prediction directionality information related to an intra prediction,
a quantization parameter of the current block or the reference area, or
an absolute sum of transform coefficients or residual signals corresponding to a neighboring area of the current block.

8. The apparatus of claim 5, wherein the at least one processor is further configured to:
encode second information related to the configuration of the input data,
wherein the input data is configured by combining, according to an input data configuration scheme that the second information represents, pixels obtained from a left reference area and an above reference area which are adjacent to the current block.

9. An apparatus for providing a video decoding device with video data, the apparatus comprising at least one processor configured to:
encode the video data into a bitstream; and,
transmit the bitstream to the video decoding device,
wherein the at least one processor is configured to encode the video data by an intra-prediction based video encoding method comprising:
configuring an input data using at least one reference area that has been encoded and then decoded prior to a current block to be encoded in a current picture, wherein the reference area is included in the current picture, and the input data is configured using average pixel values which are generated by performing an averaging operation on values of pixels in the reference area;
filtering the input data using a filter coefficient set which is in a two or three dimensional matrix form to thereby set the filtered input data as predicted pixels for the current block;
generating residual signals by subtracting the predicted pixels from pixels of the current block; and
encoding the residual signals into the bitstream,
wherein the filtering comprises selecting the filter coefficient set to apply to the current block among a plurality of filter coefficient sets each of which is in a two or three dimensional matrix form,
wherein first information, for use in selecting the filter coefficient set to be applied to the current block from among the plurality of filter coefficient sets, is further encoded into the bitstream.

* * * * *